United States Patent
Sekiguchi et al.

(10) Patent No.: US 11,391,840 B2
(45) Date of Patent: Jul. 19, 2022

(54) DISTANCE-MEASURING APPARATUS, MOBILE OBJECT, DISTANCE-MEASURING METHOD, AND DISTANCE MEASURING SYSTEM

(71) Applicants: Hiroyoshi Sekiguchi, Kanagawa (JP); Jun Kishiwada, Kanagawa (JP); Soichiro Yokota, Kanagawa (JP); Tadashi Nakamura, Kanagawa (JP); Seiya Amano, Kanagawa (JP); Kazuma Matsuura, Kanagawa (JP)

(72) Inventors: Hiroyoshi Sekiguchi, Kanagawa (JP); Jun Kishiwada, Kanagawa (JP); Soichiro Yokota, Kanagawa (JP); Tadashi Nakamura, Kanagawa (JP); Seiya Amano, Kanagawa (JP); Kazuma Matsuura, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 628 days.

(21) Appl. No.: 16/442,704

(22) Filed: Jun. 17, 2019

(65) Prior Publication Data
US 2019/0391244 A1    Dec. 26, 2019

(30) Foreign Application Priority Data
Jun. 25, 2018    (JP) .............................. JP2018-120207

(51) Int. Cl.
*G01S 17/00*    (2020.01)
*G01S 17/89*    (2020.01)
(Continued)

(52) U.S. Cl.
CPC ............ *G01S 17/89* (2013.01); *G01S 7/4865* (2013.01); *G01S 17/10* (2013.01)

(58) Field of Classification Search
USPC ......................................................... 356/5.01
See application file for complete search history.

(56) References Cited

U.S. PATENT DOCUMENTS

| | | | |
|---|---|---|---|
| 8,896,689 B2 * | 11/2014 | Asatani | G06T 7/73 348/135 |
| 9,568,605 B2 * | 2/2017 | Akatsu | G01S 7/4868 |

(Continued)

FOREIGN PATENT DOCUMENTS

| | | | | |
|---|---|---|---|---|
| EP | 3276576 | | 1/2018 | |
| EP | 3588141 A1 * | | 1/2020 | ............. G01S 17/10 |

(Continued)

OTHER PUBLICATIONS

Japanese Office Action for JP2018-120207 dated Feb. 8, 2022.
Extended European Search Report for 19177736.6 dated Nov. 12, 2019.

*Primary Examiner* — James R Hulka
(74) *Attorney, Agent, or Firm* — IPUSA, PLLC

(57) ABSTRACT

A distance-measuring apparatus, a mobile object, a distance-measuring method, and a distance-measuring system. The distance-measuring apparatus and the distance-measuring method include performing matching for a plurality of images obtained by a plurality of imaging devices to convert the plurality of images into first distance information on a pixel-by-pixel basis, emitting a laser beam where at least one of a laser-beam resolution in a horizontal direction and a laser-beam resolution in a vertical direction exceeds two degrees, obtaining a reflected signal obtained when the laser beam is reflected by an object, detecting a peak that corresponds to reflection from the object from the reflected signal, calculating second distance information based on a length of time taken to observe the peak after the laser beam is emitted in the emitting, and integrating the first distance information (Continued)

and the second distance information with each other. The mobile object includes the distance-measuring apparatus.

9 Claims, 25 Drawing Sheets

(51) Int. Cl.
*G01S 7/4865* (2020.01)
*G01S 17/10* (2020.01)

(56) References Cited

U.S. PATENT DOCUMENTS

| | | | | |
|---|---|---|---|---|
| 9,958,535 | B2* | 5/2018 | Send | G01S 17/89 |
| 10,398,006 | B2* | 8/2019 | Nakamura | G01S 17/42 |
| 10,520,309 | B2* | 12/2019 | Takahashi | G06V 20/58 |
| 10,670,726 | B2* | 6/2020 | Suzuki | G01S 11/12 |
| 10,705,195 | B2* | 7/2020 | Morikawa | G01S 17/87 |
| 10,739,456 | B2* | 8/2020 | Kubota | G01S 7/484 |
| 10,839,573 | B2* | 11/2020 | Marino | G06T 7/536 |
| 10,891,751 | B2* | 1/2021 | Sekiguchi | G01S 17/89 |
| 2013/0141546 | A1 | 6/2013 | Asatani et al. | |
| 2015/0160341 | A1 | 6/2015 | Akatsu et al. | |
| 2015/0319419 | A1* | 11/2015 | Akin | G06T 7/97 348/49 |
| 2016/0349371 | A1 | 12/2016 | Suzuki et al. | |
| 2017/0219694 | A1 | 8/2017 | Send et al. | |
| 2017/0273161 | A1 | 9/2017 | Nakamura | |
| 2017/0278289 | A1* | 9/2017 | Marino | G06T 11/60 |
| 2017/0363740 | A1 | 12/2017 | Kubota et al. | |
| 2018/0106894 | A1 | 4/2018 | Morikawa et al. | |
| 2018/0120108 | A1 | 5/2018 | Takahashi et al. | |
| 2019/0228537 | A1* | 7/2019 | Sekiguchi | B60R 11/04 |

FOREIGN PATENT DOCUMENTS

| | | | |
|---|---|---|---|
| EP | 3540467 B1 * | 12/2020 | G01S 17/10 |
| JP | 2004-347471 | 12/2004 | |
| JP | 2013-120083 | 6/2013 | |
| JP | 2015-129734 | 7/2015 | |
| JP | 2017-054481 | 3/2017 | |
| JP | 2017-173298 | 9/2017 | |
| JP | 2018-17506 | 2/2018 | |

* cited by examiner

FIG. 1

| | SPATIAL RESOLUTION | DISTANCE RESOLUTION |
|---|---|---|
| STEREO CAMERA | HIGH RESOLUTION WITH APPROXIMATELY 1 TO 4 MEGAPIXELS | DISTANCE Z= BASE-LINE LENGTH B × FOCAL LENGTH F/DISPARITY D LACK OF RESOLUTION AT REMOTE PLACE |
| LiDAR | AS LIGHT BEAMS RADIATE IN ALL DIRECTIONS, THERE IS LACK OF LIGHT INTENSITY AND LACK OF RESOLUTION AT REMOTE PLACE | DISTANCE Z=SPEED OF LIGHT C×(TIME T/2) HIGH RESOLUTION REGARDLESS OF DISTANCE |
| PRINCIPLE FUSION | HIGH RESOLUTION EVEN AT REMOTE PLACE | HIGH RESOLUTION EVEN AT REMOTE PLACE |

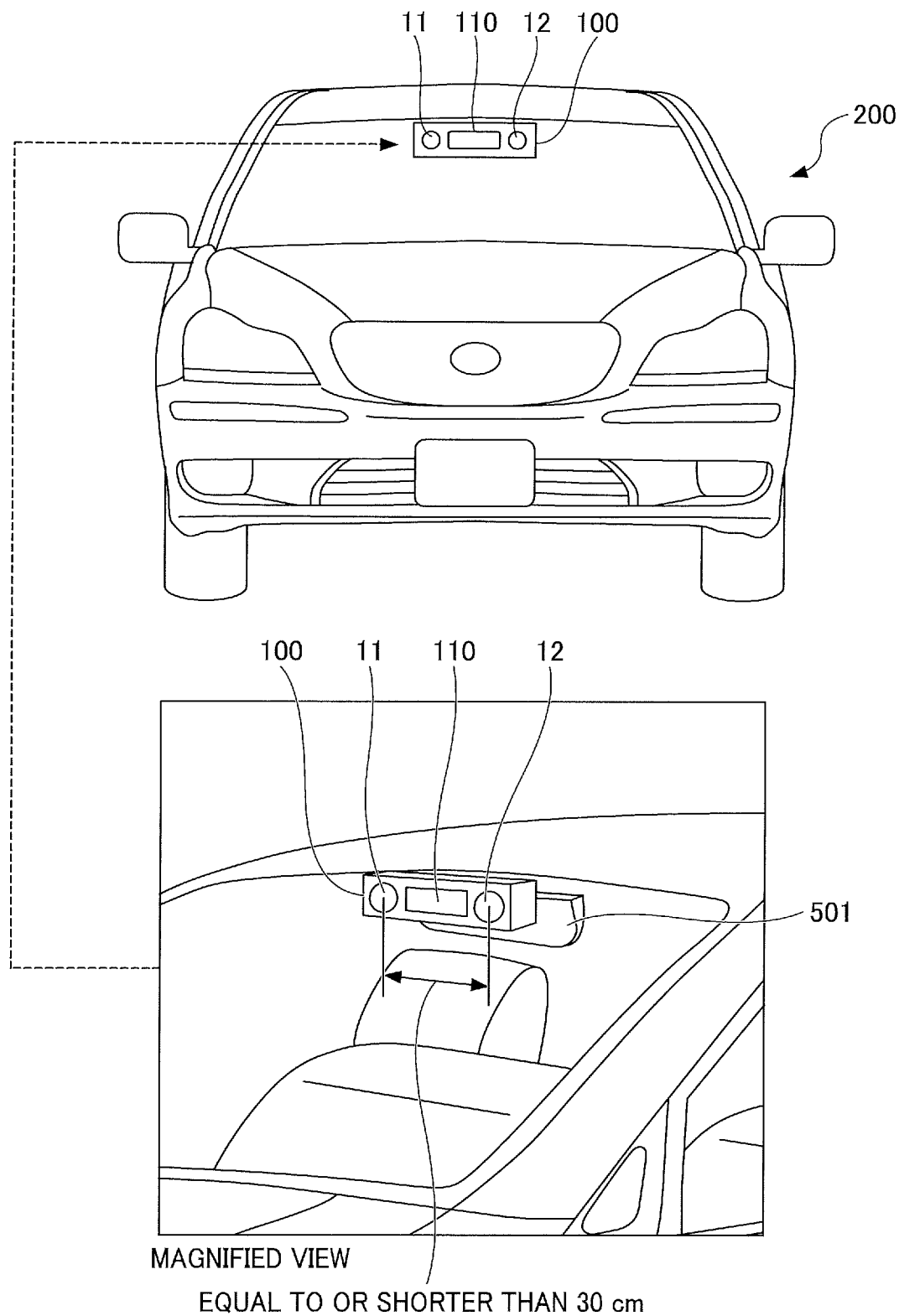

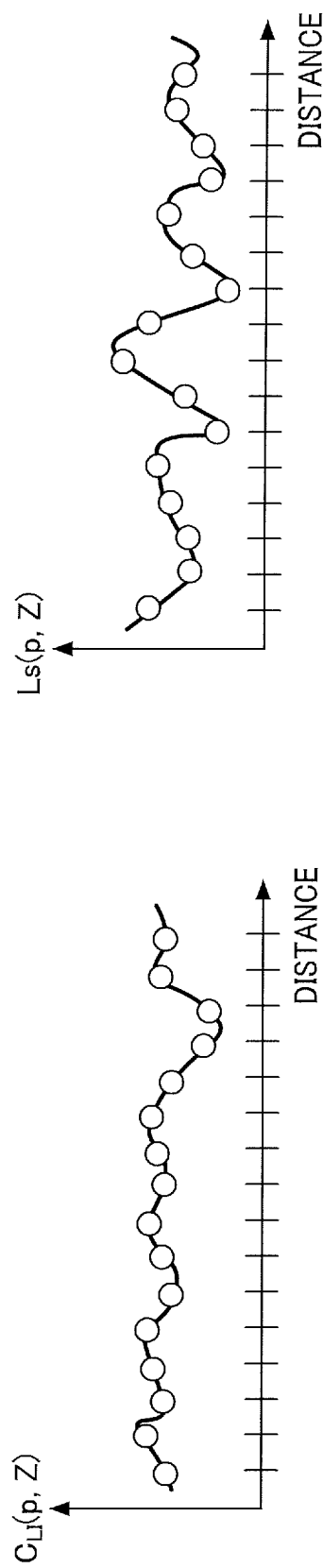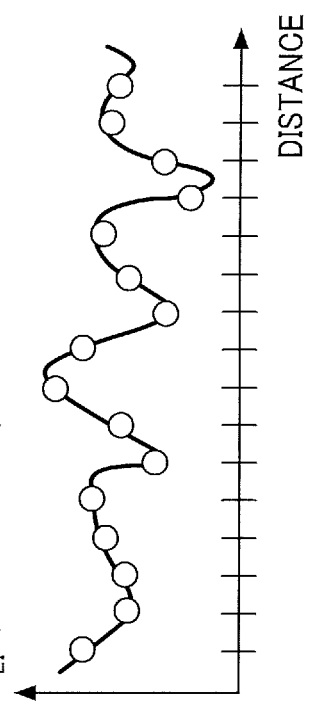

DISTANCE-MEASURING APPARATUS, MOBILE OBJECT, DISTANCE-MEASURING METHOD, AND DISTANCE MEASURING SYSTEM

CROSS-REFERENCE TO RELATED APPLICATION

This patent application is based on and claims priority pursuant to 35 U.S.C. § 119(a) to Japanese Patent Application No. 2018-120207, filed on Jun. 25, 2018, in the Japan Patent Office, the entire disclosure of which is hereby incorporated by reference herein.

BACKGROUND

Technical Field

Embodiments of the present disclosure relate to a distance-measuring apparatus, a mobile object, a distance-measuring method, and a distance-measuring system.

Background Art

As an algorithm for calculating a disparity for stereo cameras, block matching in which feature points are used is known in the art. In the block matching, a feature point is searched for while shifting a right or left image, and the amount of shift is regarded as a disparity. Then, a cost is calculated on a disparity-by-disparity basis, and a disparity that minimizes the cost in the searching disparity space is detected. Finally, in the block matching, the distance to each pixel is calculated according to an equation "$Z=BF/d$" indicating the relation between a disparity d and a distance Z, where B denotes a base-line length and F denotes a focal length. The semi-global matching (SGM) propagation method where a disparity value is precisely derived even from an object with a little texture is also known in the art.

However, it is difficult to secure the distance resolution at a remote site in regard to the distance that is calculated from a disparity using such an algorithm as above for calculating a disparity, and the variations in value of distance measurement (or the distribution of the values of distance measurement) tend to increase.

For example, in the on-vehicle industry as typified by automatic driving industry, improvement in performance of distance measuring at a remote point is sought after. In order to achieve such improvement, correction of the distance that is calculated from a disparity using calculator algorithm as above for calculating a disparity, using the distance information obtained by using light detection and ranging (LiDAR) or laser imaging detection and ranging (LiDAR) where the spatial resolution is low but the range resolution is high, is under study. In the LiDAR, the distance to an object is calculated based on the length of time it takes from a point in time when a laser beam is emitted to an object until a point in time when a reflected signal returns from the object. For example, methods in which a peak of the reflected signals is detected are known in the art as a method of specifying a reflected signal from an object based on the reflected signals that are obtained in chronological order.

Conventionally, an attempt to combine the measurement result obtained by a LiDAR device where the spatial resolution is low but the range resolution is high with the measurement result of a stereo camera where the spatial resolution is high but the distance resolution is low at a remote point is known in the art (see, for example, JP-2015-143676-A). Such a combination may be referred to as a fusion. JP-2015-143676-A discloses a disparity computation system that generates a disparity image. In such a disparity computation system, the distance information obtained by using the LiDAR is associated with each one of the pixels of a captured image, and a value based on the distance information associated with each one of the pixels of the captured image is used to compute the disparity of each one of the pixels of the captured image. Due to such a fusion as above, for example, output of a three-dimensional high-resolution distance-measuring result, a narrow distribution of values of distance measurement, highly-precise detection of a surface of discontinuity, downsizing, and an improvement in environmental robustness may be achieved.

SUMMARY

Embodiments of the present disclosure described herein provide a distance-measuring apparatus, a mobile object, a distance-measuring method, and a distance-measuring system. The distance-measuring apparatus and the distance-measuring method include performing matching for a plurality of images obtained by a plurality of imaging devices to convert the plurality of images into first distance information on a pixel-by-pixel basis, emitting a laser beam where at least one of a laser-beam resolution in a horizontal direction and a laser-beam resolution in a vertical direction exceeds two degrees, obtaining a reflected signal obtained when the laser beam is reflected by an object, detecting a peak that corresponds to reflection from the object from the reflected signal, calculating second distance information based on a length of time taken to observe the peak after the laser beam is emitted in the emitting, and integrating the first distance information and the second distance information with each other. The mobile object includes the distance-measuring apparatus. The distance-measuring system includes the distance-measuring apparatus.

BRIEF DESCRIPTION OF THE DRAWINGS

A more complete appreciation of embodiments and the many attendant advantages thereof will be readily obtained as the same becomes better understood by reference to the following detailed description when considered in connection with the accompanying drawings.

FIG. 1 is a diagram illustrating the spatial resolution and the distance resolution of a stereo camera, a LiDAR device, and a principle fusion in comparison to each other.

FIG. 7 is an external view of a distance-measuring apparatus installed in a vehicle in front of a rear-view mirror, according to an embodiment of the present disclosure.

FIG. 12C is implemented, according to an embodiment of the present disclosure.

FIG. 22A, FIG. 22B, and FIG. 22C are schematic diagrams of a fusion between synthesis costs and LiDAR costs, according to an embodiment of the present disclosure.

Figure 2A:
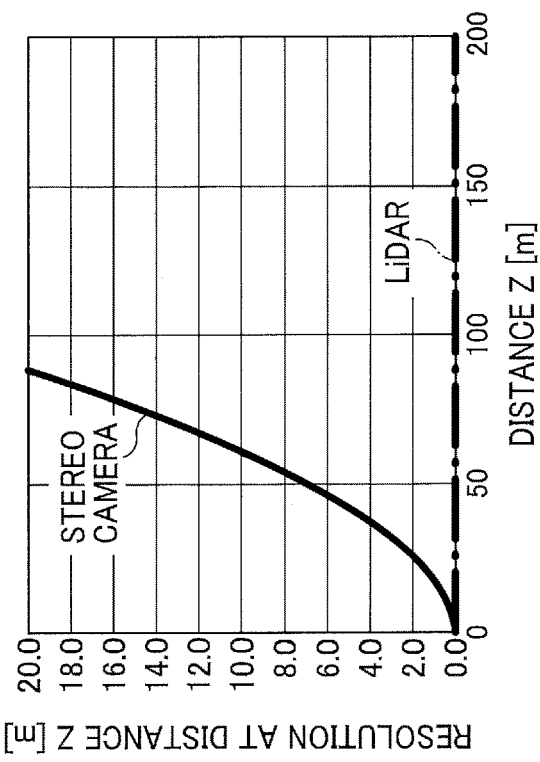
FIG. 2A and FIG. 2B are diagrams each illustrating the relation between the distance resolution and the spatial resolution of a stereo camera and a LiDAR device depending on varying distance.

The accompanying drawings are intended to depict embodiments of the present disclosure and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing example embodiments shown in the drawings, specific terminology is employed for the sake of clarity. However, the present disclosure is not intended to be limited to the specific terminology so selected and it is to be understood that each specific element includes all technical equivalents that have the same structure, operate in a similar manner, and achieve a similar result.

In the following description, illustrative embodiments will be described with reference to acts and symbolic representations of operations (e.g., in the form of flowcharts) that may be implemented as program modules or functional processes including routines, programs, objects, components, data structures, etc., that perform particular tasks or implement particular abstract data types and may be implemented using existing hardware at existing network elements or control nodes. Such existing hardware may include one or more central processing units (CPUs), digital signal processors (DSPs), application-specific-integrated-circuits (ASICs), field programmable gate arrays (FPGAs), computers or the like. These terms in general may be collectively referred to as processors.

Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

A distance-measuring apparatus and a method of measuring distance using the distance-measuring apparatus according to an embodiment of the present disclosure are described below with reference to the accompanying drawings.

Fusion between Distance Measurement by Stereo Camera and Distance Measurement by LiDAR Device Supplemental description of the fusion between the distance measurement performed by a stereo camera and the distance measurement performed by a light detection and ranging (LiDAR) device is given below. As a LiDAR device emits a laser beam, a LiDAR device may be referred to as a laser radar in the present embodiment. The light that is emitted by a laser radar (LiDAR device) is not limited to a laser beam, and the light source of a laser radar may be a light-emitting diode (LED).

Stereo cameras are characterized in that the spatial resolution is high but the distance resolution is low when at a remote point, and LiDAR devices are characterized in that the spatial resolution is low but the distance-measuring resolution is high. In a principle fusion where fusion is performed between the data obtained by a stereo camera and the data obtained by a LiDAR device at an early stage, a three-dimensional high-resolution distance-measuring image where the distance resolution is high even at a remote point and the spatial resolution is also high can be output.

As described above, the following problems of a stereo camera and a LiDAR device can be solved by a principle fusion.

1. Technical Problem of Stereo Camera

Accuracy of Distance Measurement: As the distance resolution gets low when at a remote point, the distance measurement and object detection are difficult when an object is at a remote point.

Targeting Capability: Erroneous matching tends to occur due to repeated patterns or poor texture, and a number of distance values with large variances tend to be detected.

Environmental Resistance: As almost no texture can be detected in the nighttime, it is difficult to calculate the distance.

Downsizing: In order to achieve downsizing, the base-line length needs to be shortened, and thus it is difficult to adopt, for example, a central processing unit (CPU) with high computation performance. If a program that require a lot of processes to be executed is installed in order to improve the precision of the processing, the processing time tends to get longer. When it is desired to shorten the processing time, for example, a smaller CPU with high computation performance needs to be adopted.

This leads to an increase in cost, which could be problematic.

2. Technical Problem of LiDAR Device

The distance resolution gets lower as the distance to an object is longer.

A method in which a threshold is set and a distance value is output is adopted. For this reason, a reflected signal whose value falls below the threshold is ignored even when a peak is actually detected. In particular, when a peak of a reflected signal is detected from a remote point, such a peak is not used even though a relevant signal is successfully obtained.

It is difficult to install a large number of light-emitting elements and light-receiving elements, and large light-emitting elements or large light-receiving elements cannot be installed. Due to this configuration, a reflected signal is extremely weak, and when the noise level of a reflected signal is relatively close to the magnitude of a peak of a reflected signal that corresponds to an object (when a signal-to-noise ratio (S/N ratio) of a signal is low), it is difficult to obtain accurate distance with a method in which a threshold is set. When a light-emitting element is multi-layered or the LiDAR device is designed to have fine resolution, the manufacturing cost increases and the scanning of one plane cannot be done speedily, which could be disadvantageous.

The performance that is to be achieved by a principle fusion according to an embodiment of the present disclosure is described below.

FIG. 1 is a diagram illustrating the spatial resolution and the distance resolution of a stereo camera, a LiDAR device, and a principle fusion in comparison to each other.

As illustrated in FIG. 1, the spatial resolution of a stereo camera is high, and the spatial resolution of a LiDAR device is low when an object is at a remote point. However, when a principle fusion is adopted, high spatial resolution is achieved even when an object is at a remote point. The distance resolution of a stereo camera is low when an object is at a remote point, and the distance resolution of a LiDAR device is high regardless of the distance. However, when a principle fusion is adopted, high distance resolution is achieved even when an object is at a remote point. The performance that goes beyond the principle of measurement of a stereo camera and a LiDAR device can be obtained in such a principle fusion.

In the principle fusion according to the present embodiment, distance measuring can precisely be performed even when an object is at a remote point due to a synergetic effect of the performance of distance measuring by a stereo camera and a LiDAR device, and the reflection light (return light) may be weak. As the spatial resolution equivalent to that of the stereo camera can be achieved without increasing the spatial resolution of the LiDAR device, space separation may be achieved with an even lower laser-beam resolution. A low laser-beam resolution is described below with reference to FIG. 2A and FIG. 2B.

Figure 2B:
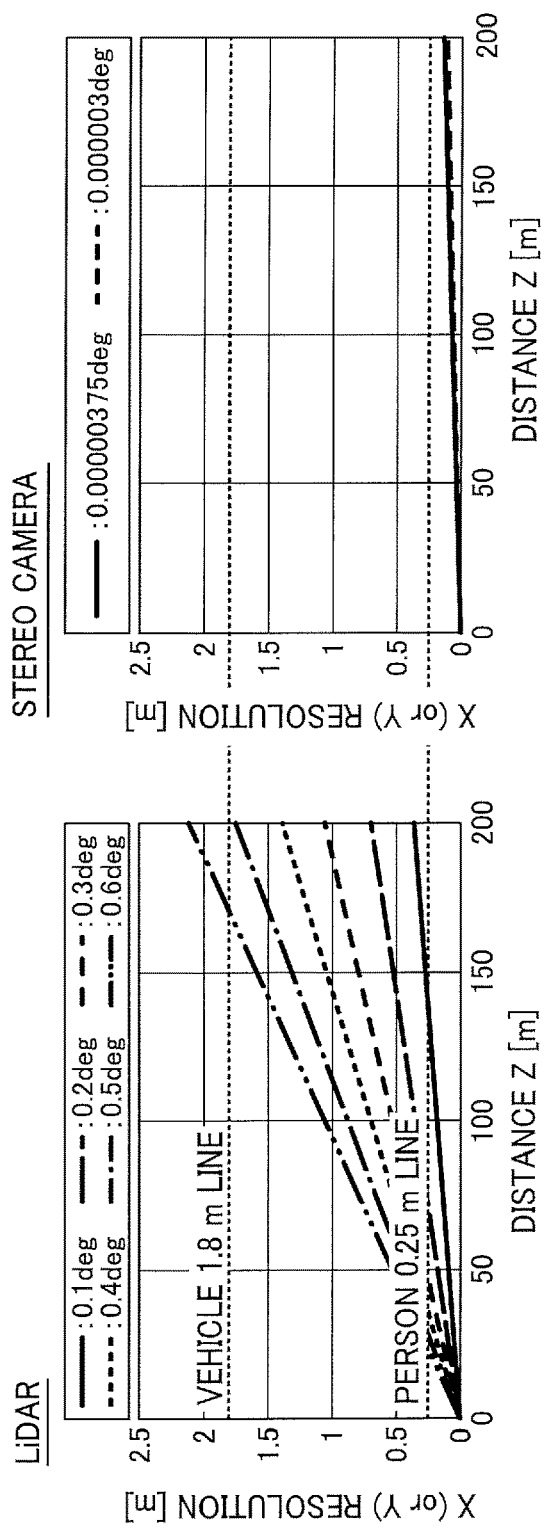

FIG. 2A and FIG. 2B are diagrams each illustrating the relation between the distance resolution and the spatial resolution of a stereo camera and a LiDAR device depending on varying distance.

Firstly, FIG. 2A illustrates a distance resolution. As illustrated in FIG. 1, the distance resolution of a stereo camera sharply deteriorates when an object is at a remote point.

FIG. 2B is a diagram illustrating the spatial resolution.

As illustrated on the right side of FIG. 2B, the spatial resolution of a stereo camera is high even when an object is at a remote point. By contrast, the spatial resolution of a LiDAR device deteriorates when an object is at a remote point. In FIG. 2B, the spatial resolution of a laser beam is illustrated for each one of the laser-beam resolutions of 0.1, 0.2, 0.3, 0.4, 0.5, and 0.6 degrees. The laser-beam resolution indicates the angle of the directions in which one laser beam diverges. Laser beams diverge as the distance gets longer, and the spatial resolution at a remote point deteriorates as the laser-beam resolution is greater.

In FIG. 2B, two lines are drawn at the spatial resolutions of 25 centimeters (cm) and 1.8 m, respectively. 25 cm corresponds to the size of a pedestrian, and 1.8 m corresponds to the size of a vehicle. For example, it is assumed that a vehicle at a distance of 200 m is captured by a laser beam. Under such circumstances, a laser beam whose laser-beam resolution is 0.5 degrees diverges to the width of less than 1.8 m at a point of 200 m distance ahead of the LiDAR device. Accordingly, when the laser-beam resolution of a laser beam is equal to or lower than 0.5 degrees, a laser beam hits a vehicle at a distance of 200 m. In other words, two or more vehicles at a distance of 200 m ahead of the LiDAR device can separately be detected even with a relatively low laser-beam resolution such as 0.5 degrees.

In the principle fusion according to the present embodiment, space separation can be performed with the spatial resolution of a stereo camera. Due to this configuration, the laser-beam resolution of the LiDAR may be low. For example, a high laser-beam resolution such as 0.1 to 0.2 degrees is not necessary for the principle fusion. When a low laser-beam resolution is acceptable, as will be described later in detail, space saving or cost reduction of a LiDAR distance-measuring apparatus can be achieved.

Example of Low Laser-Beam Resolution

Figure 3:
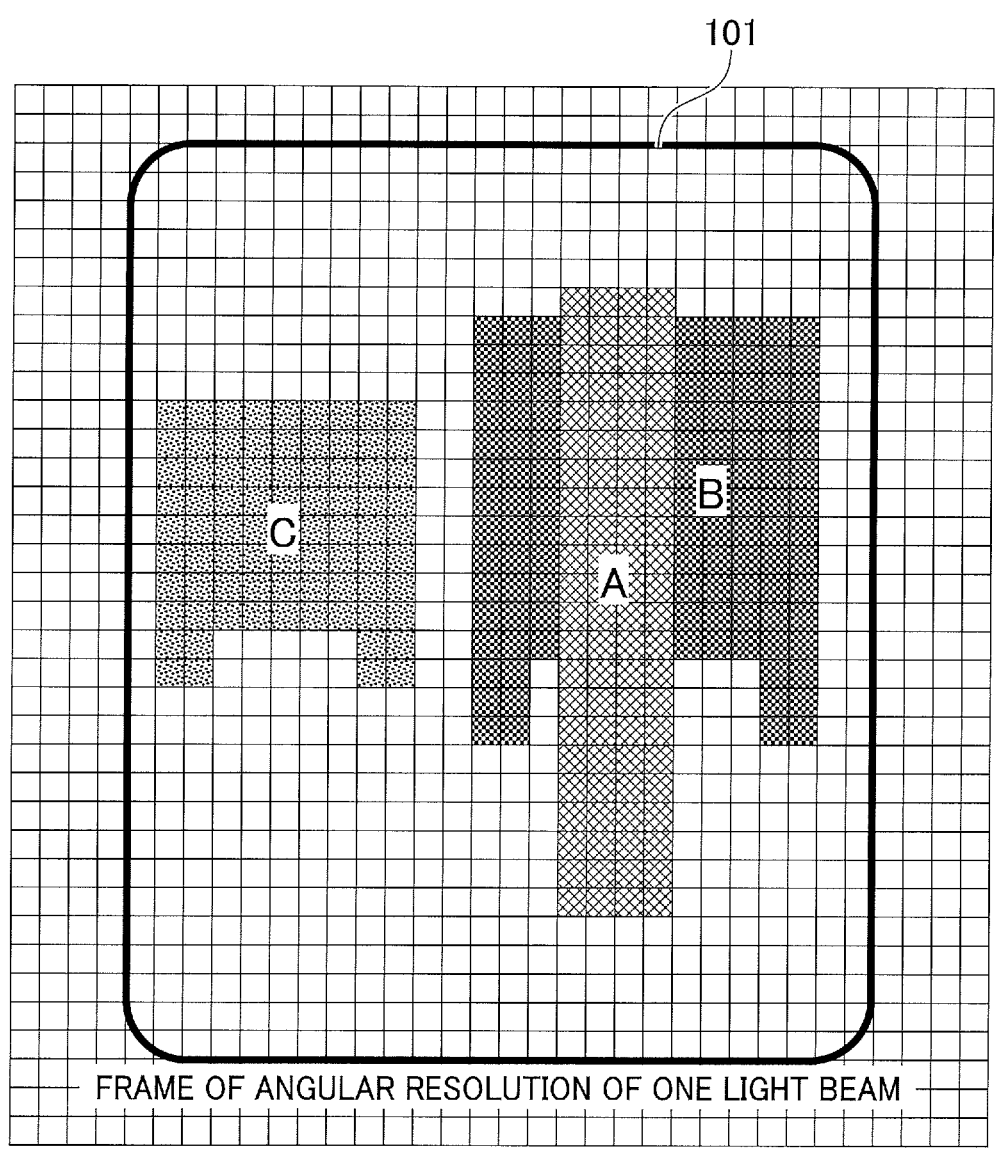
FIG. 3 is a diagram illustrating three objects in an irradiation field of low laser-beam resolution, according to an embodiment of the present disclosure.

FIG. 3 is a diagram illustrating three objects A to C in an irradiation field of low laser-beam resolution, according to the present embodiment.

For example, it is assumed that there are a plurality of objects A, B, and C and the relation among these objects in distance is as in "A<B<C." Almost the entirety of the irradiation field 101 including the objects A to C therein can be irradiated with one laser beam of low laser-beam resolution. In other words, the irradiation field 101 is a range that can be irradiated at a time with one laser beam.

Figure 4:
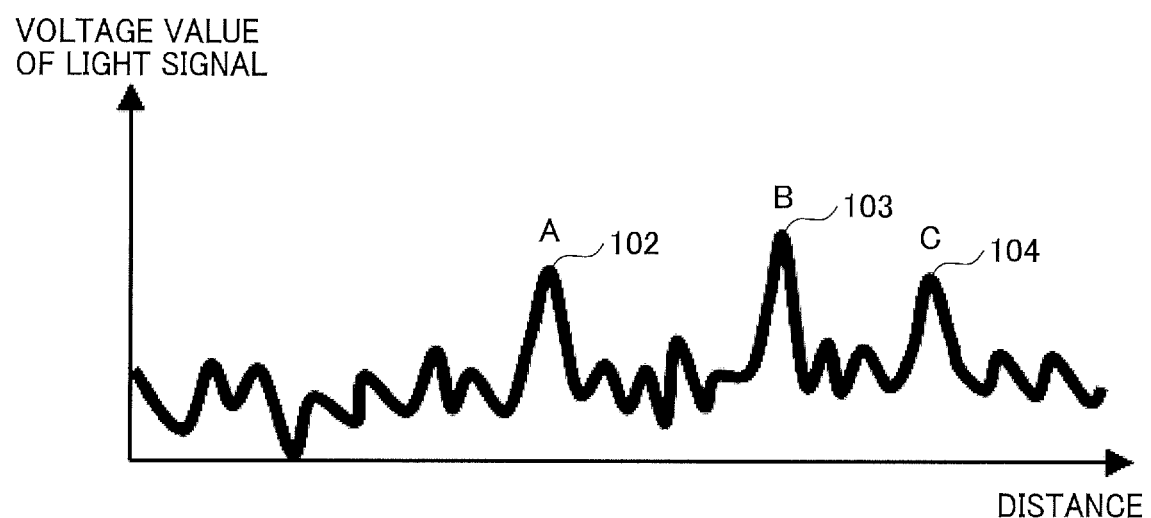
FIG. 4 is a schematic diagram illustrating a reflected signal obtained when a laser beam is reflected by a plurality of objects, according to an embodiment of the present disclosure.

FIG. 4 is a schematic diagram illustrating a reflected signal obtained when a laser beam is reflected by objects A to C.

As illustrated in FIG. 3, the objects A to C are irradiated with a laser beam, and a reflected signal with multiple pulses is obtained. A reflected signal with multiple pulses refers to the phenomenon in which reflected signals return from a plurality of objects in response to one-time emission of a laser beam. As illustrated in FIG. 4, the three peaks 102 to 104 that correspond to the objects A to C are obtained for a reflected signal.

In FIG. 4, the distances to the objects A to C can be detected by comparing the obtained three peaks 102 to 104 with a threshold. However, the peaks 102 to 104 may substantially be buried in noise in a reflected signal obtained from a remote object or an object with a small reflection coefficient, and no peak may be obtained in a clear manner. However, in the present embodiment, the distance can be calculated using the data obtained by a stereo camera due to the principle fusion according to the present embodiment. Accordingly, the planes of the objects A to C each of which indicates the distance can be separated from each other.

Example Application to Distance-Measuring Apparatus

An example case in which a distance-measuring apparatus 100 is applied is described below with reference to FIG. 5.

Figure 5:
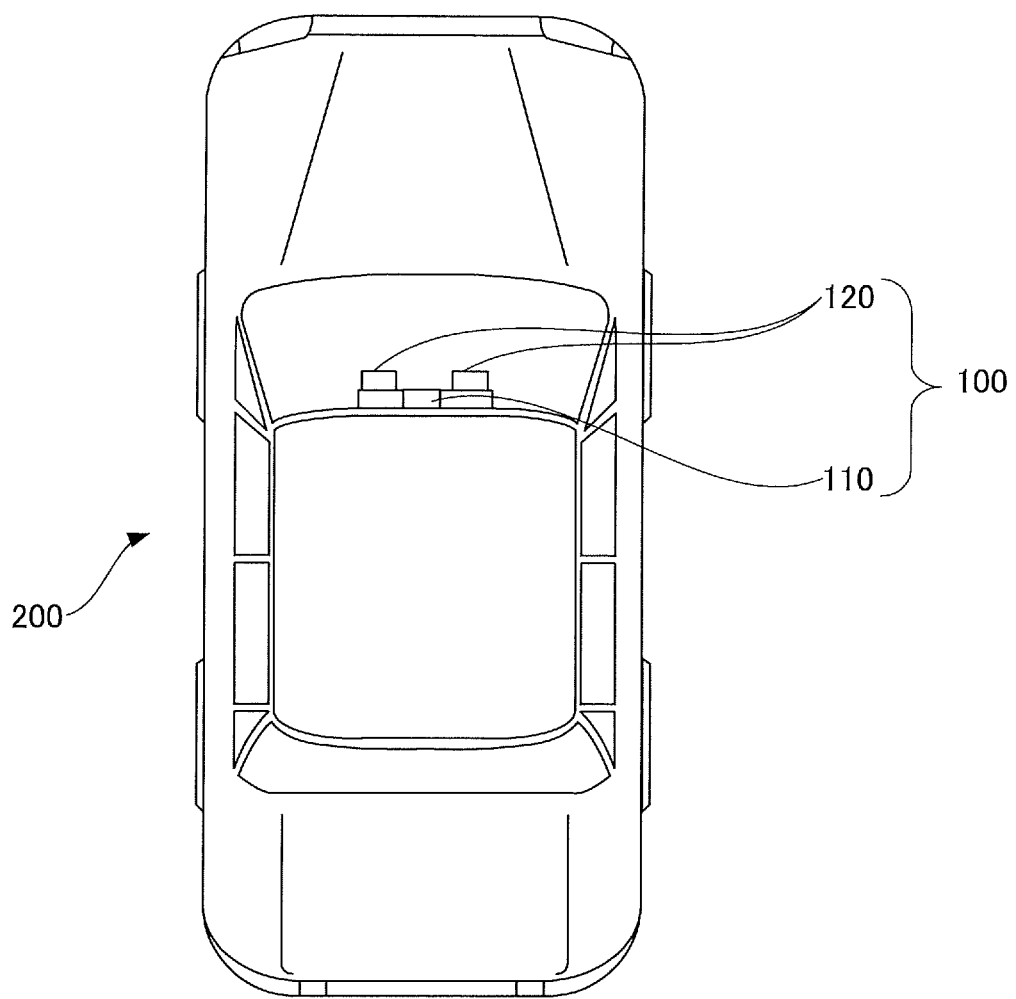
FIG. 5 is a diagram illustrating a distance-measuring apparatus provided for a car as an example of a mobile object, according to an embodiment of the present disclosure.

FIG. 5 is a diagram illustrating the distance-measuring apparatus 100 provided for a car 200 as an example of a mobile object, according to the present embodiment.

In FIG. 5, the distance-measuring apparatus 100 is attached to the inner surface of the windshield of the car 200 at the center. The distance-measuring apparatus 100 includes the LiDAR range finder 110 and the stereo camera unit 120. Both the LiDAR range finder 110 and the stereo camera unit 120 are disposed such that the distance-measuring ranges of these devices exist ahead of the mobile object. It is assumed that the LiDAR range finder 110 is arranged between the stereo cameras (i.e., two imaging devices) of the stereo camera unit 120 (preferably, in the middle).

The LiDAR range finder 110 is referred to as a LiDAR device, and emits pulsed extravisual laser beams using a laser diode (LD). Then, the LiDAR range finder 110 measures the length of time it takes for the pulse to return to calculate the distance. Such a method of calculating the distance is referred to as a time-of-flight (TOF) method. The direction and distance where a pulse of light is reflected at a certain moment are recorded as a point on a three-dimensional map around the LiDAR range finder 110.

Laser Irradiation Field of LiDAR Range Finder

Figure 6A:
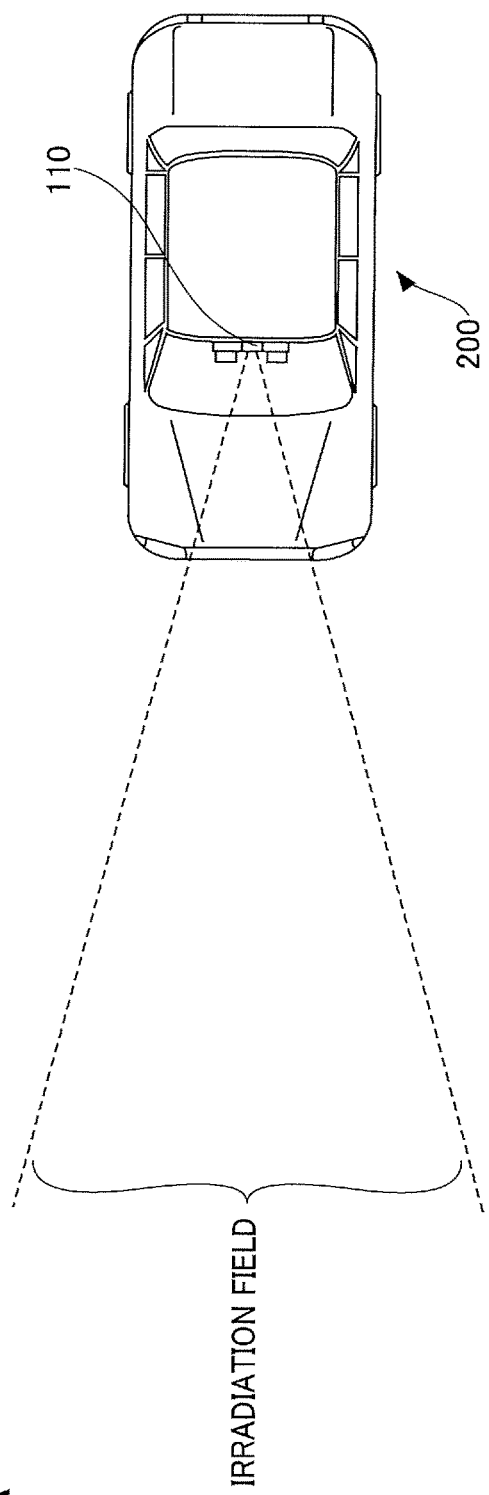
FIG. 6A and FIG. 6B are diagrams each illustrating the irradiation field of the laser beams emitted by a LiDAR range finder, according to an embodiment of the present disclosure.
Figure 6B:
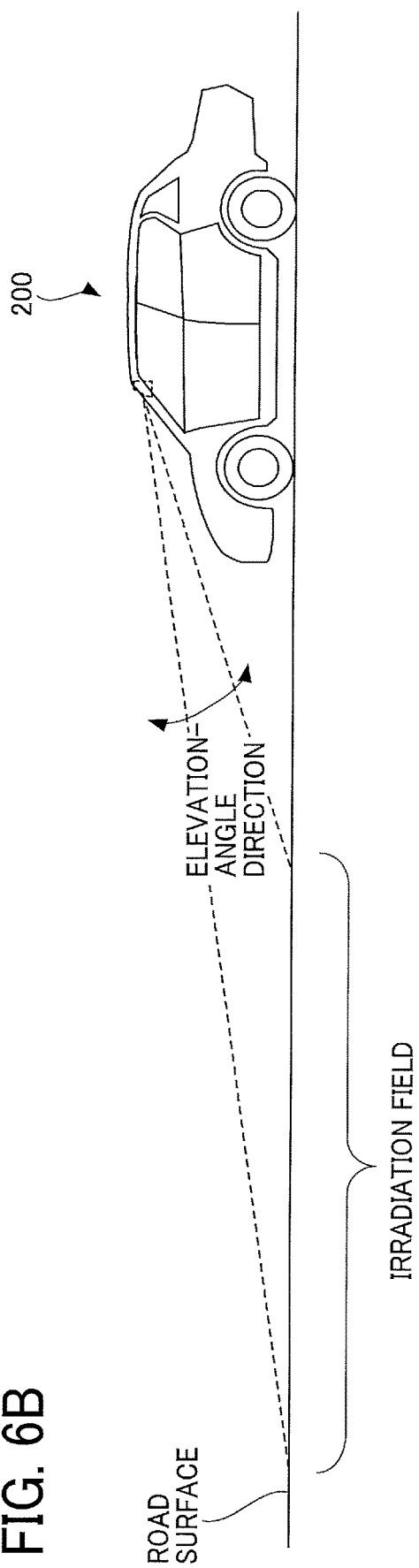

FIG. 6A and FIG. 6B are diagrams each illustrating the irradiation field of the laser beams emitted by the LiDAR range finder 110, according to the present embodiment.

FIG. 6A is a top view of the car 200, according to the present embodiment.

FIG. 6B is a side view of the car 200, according to the present embodiment.

As illustrated in FIG. 6A, the LiDAR range finder 110 emits laser beams while scanning a prescribed range ahead of the distance-measuring apparatus in the directions of travel of the car 200 (irradiation field in the side to side directions) in the horizontal direction. Note that the laser beam may be regarded as light or an electromagnetic wave.

As illustrated in FIG. 6B, the LiDAR range finder 110 emits laser beams towards a prescribed range in the directions of travel of the car 200. How far the laser beams can reach depends on the output power of the LiDAR range finder 110. Typically, the distance-measurable range is about several hundreds of meters. On the other hand, the distance-measurable range on a close side may be less than one meter. However, typically, the necessity for distance measurement in such a close range is low. For this reason, the distance-detectable range may be set as desired.

The LiDAR range finder 110 is configured to perform scanning in the horizontal directions while rotating the irradiation direction of the laser beams in an elevation-angle direction. Due to this configuration, an irradiation field of any distance including a close distance and a long distance can be irradiated with light with reference to the installed position of the LiDAR range finder 110.

Size of Distance-Measuring Apparatus

For example, the distance-measuring apparatus 100 that is mounted in a vehicle has a smaller size as much as possible. As a stereo camera needs to capture an image of the scene ahead of the vehicle, the position at which the stereo camera is disposed is limited so as not to interrupt or obstruct the driver's view ahead of the vehicle. In most cases, a stereo camera is disposed inside the car. In other words, a stereo camera is disposed in the limited space so as not to disturb the occupants of the vehicle. For example, given that a stereo camera is disposed within the front windshield ahead of the rear-view mirror, preferably, the size of the stereo camera is so small that the driver who has to view or manipulate the rear-view mirror is not disturbed by the existence of the stereo camera.

FIG. 7 is an external view of the distance-measuring apparatus 100 installed in a vehicle in front of a rear-view mirror 501, according to the present embodiment.

The distance-measuring apparatus 100 is arranged in the center in the vehicle width direction and on the ceiling between the rear-view mirror 501 and the front windshield. Moreover, the LiDAR range finder 110 is disposed as an imaging device between the right camera 11 and left camera 12. In other words, the right camera 11, the left camera 12, and the LiDAR range finder 110 are disposed in a straight line. As described above, according to the present embodiment, the LiDAR range finder 110 and the stereo camera unit 120 are accommodated in a single housing. Due to this configuration, the number of assembling steps can be reduced.

Preferably, the width of the distance-measuring apparatus 100 is narrower than the width of the rear-view mirror 501 such that the driver is not disturbed or obstructed by the distance-measuring apparatus 100. Although the rear-view mirror 501 may have a varying size, preferably, the width of the distance-measuring apparatus 100 is equal to or narrower than, for example, 30 cm when it is assumed that the width of a general-purpose rear-view mirror is 30 cm.

At minimum, the width of the distance-measuring apparatus 100 needs to be wider than the width of the LiDAR range finder 110 when the LiDAR range finder 110 is disposed between the right camera 11 and left camera 12, For this reason, the width of the distance-measuring apparatus 100 may be defined as follows.

Width of LiDAR Range Finder 110<Width of Distance-measuring Apparatus 100<30 cm

The width of the LiDAR range finder 110 may vary depending on, for example, the design, manufacturing technology, and the required precision, but it is considered that the minimum width of the LiDAR range finder 110 is, for example, at least 4 or 5 cm. For this reason, the width of the distance-measuring apparatus 100 may be defined as follows.

4 to 5 cm≤Width of Distance-measuring apparatus 100≤30 cm

It is known in the art the distance resolution is low at a remote point when the base-line length of the stereo camera is too short. Note also that the distance resolution depends on the pitches of pixels and the focal length. For example, when it is assumed that the base-line length of a stereo camera with desired capability is 8 cm, the width of the distance-measuring apparatus 100 needs to be equal to or wider than 8 cm. For this reason, the width of the distance-measuring apparatus 100 may be defined as follows.

8 cm≤Width of Distance-measuring Apparatus 100≤30 cm

As described above, the distance-measuring apparatus 100 according to the present embodiment can be implemented with a significantly smaller size than the sizes in the related art.

Hardware Configuration of Distance-measuring Apparatus

A schematic configuration of the distance-measuring apparatus 100 according to the present embodiment is described below with reference to FIG. 8.

Figure 8:
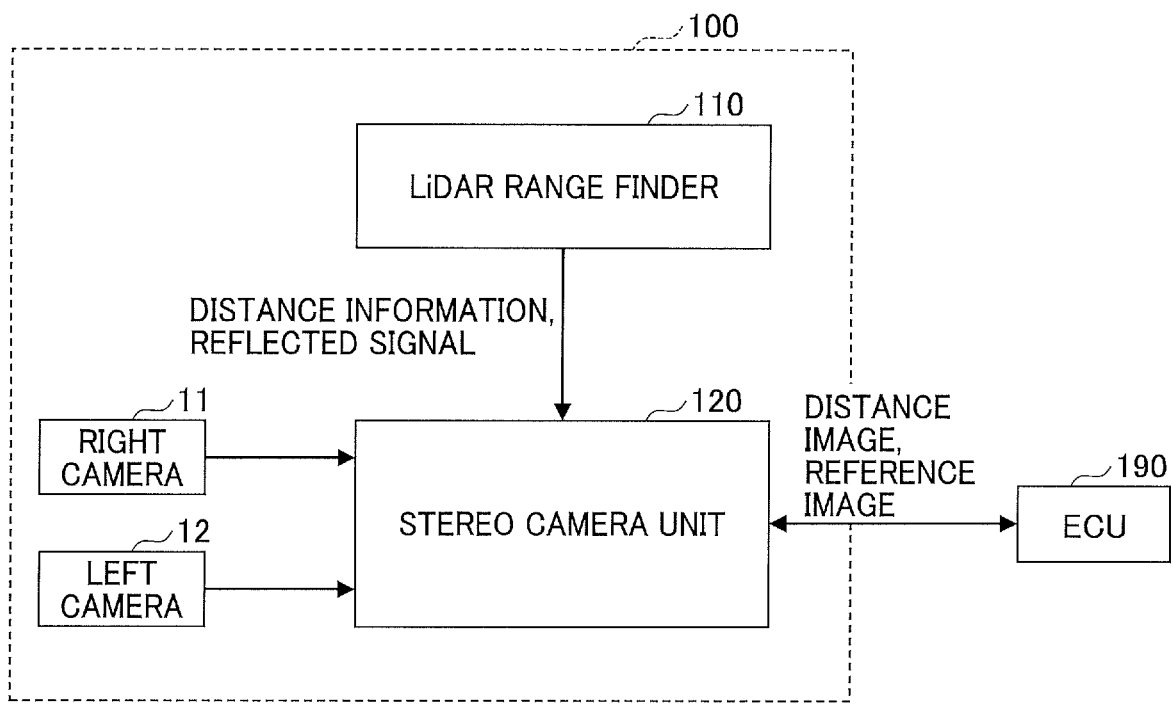
FIG. 8 is a diagram illustrating a schematic configuration of a distance-measuring apparatus according to an embodiment of the present disclosure.

FIG. 8 is a diagram illustrating a schematic configuration of the distance-measuring apparatus 100 according to the present embodiment.

The distance-measuring apparatus 100 is configured such that the LiDAR range finder 110 and the stereo camera unit 120 can exchange data with each other as desired. As described above, the distance-measuring apparatus 100 is provided with the stereo camera unit 120 that processes a reference image and a comparison image to output a distance image, in addition to the right camera 11 and the left camera 12.

The LiDAR range finder 110 outputs the reflected signals that are obtained in chronological order to the stereo camera unit 120. Furthermore, the LiDAR range finder 110 may output the distance information of each irradiation direction to the stereo camera unit 120. Note also that the distance information can be calculated from the reflected signals.

The stereo camera unit 120 generates a detailed distance image using a reflected signal obtained for each irradiation direction, and outputs the generated distance image to an electronic control unit (ECU) 190. As a fusion between the LiDAR range finder 110 and the stereo camera unit 120 is performed as described above, three-dimensional data with a high degree of precision can be obtained.

Alternatively, the stereo camera unit 120 may output a processing range that predicts a peak of a reflected signal to the LiDAR range finder 110. As the stereo camera unit 120 performs block matching to compute the distance to each pixel, the stereo camera unit 120 can estimate the distance to an object existing in an irradiation field. When it is assumed that the neighborhood of the estimated distance is the processing range, there is high possibility that a peak of a reflected signal is within a processing range, and the LiDAR range finder 110 detects a peak of the reflected signal from the processing range. Due to this configuration, a peak can be detected even when a peak is buried in noise.

In FIG. 8, by way of example, the distance images and the reference images are sent out to an electronic control unit (ECU) 190. The ECU 190 is an electronic control unit provided for a vehicle. The distance-measuring apparatus 100 that is mounted in a vehicle may be referred to as an on-vehicle device in the following description. The ECU 190 performs various kinds of driver assistance using the distance images and reference images output from the distance-measuring apparatus 100. Various kinds of pattern matching is performed on a reference image to recognize the conditions of, for example, a preceding vehicle, pedestrian, white line, and a traffic signal.

There are varying kinds of driver assistance depending on the type of vehicle. For example, when the side-to-side positions of an object overlaps with the vehicle width of the user's vehicle, warning or braking is performed as driver assistance depending on the time to collision (TTC) calculated from the distance and the relative velocity. When it is difficult to stop the vehicle before a collision occurs, the steering is controlled so as to avoid a collision.

Moreover, the ECU 190 performs adaptive cruise control (ACC) to follow the preceding vehicle with a following distance that varies depending on the vehicle speed. Once a preceding vehicle stops, the user's vehicle is also stopped. When the preceding vehicle starts moving, the user's vehicle is also starts moving. For example, when the ECU 190 is capable of recognizing a white line, lane keeping assist may be performed to control the steering such that the user's vehicle travels forward in the center of the traffic lane. Moreover, when there is some concern that the user's vehicle departs from the traffic lane, for example, lane-departure prevention may be performed to shift the direction of travel towards the traffic lane.

When an obstacle is detected in the directions of travel when the user's vehicle is stopped, unintended acceleration can be prevented. For example, when an obstacle is detected in the directions of travel that are determined by the operative position of a shift lever and the amount of force applied to the accelerator pedal is large, a possible damage can be reduced by warning or ceasing the engine output.

Figure 9:
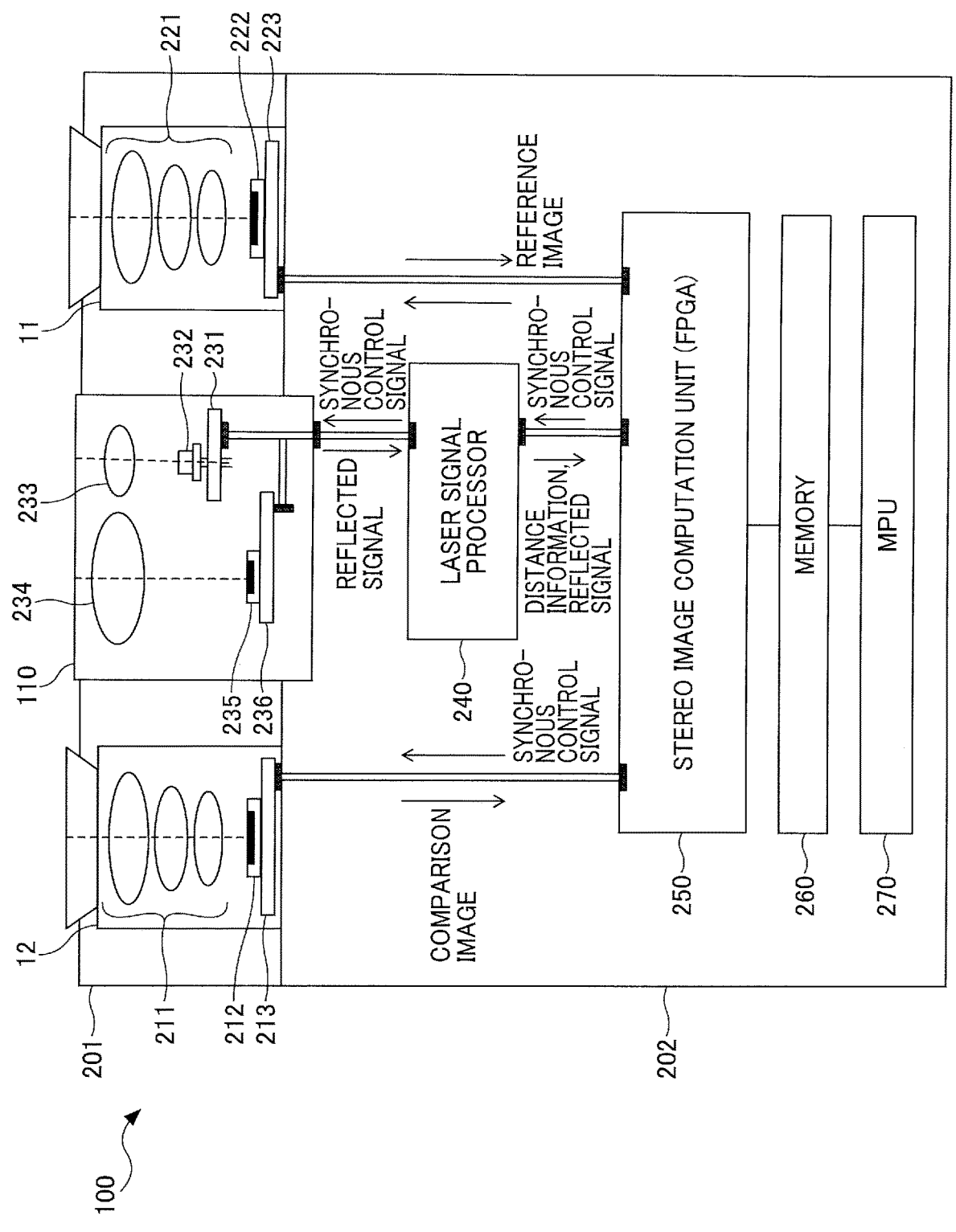
FIG. 9 is a diagram illustrating a hardware configuration of a distance-measuring apparatus according to an embodiment of the present disclosure.

FIG. 9 is a diagram illustrating a hardware configuration of the distance-measuring apparatus 100 according to the present embodiment.

The distance-measuring apparatus 100 includes a sensor stay 201 and a control board housing 202. Among those elements, only the control board housing 202 that performs computation may be referred to as the distance-measuring apparatus 100. In such a configuration, a system that includes the control board housing 202 and the sensor stay 201 that includes a plurality of cameras and an irradiation unit that emits laser beams and a light receiver that receives laser beams is referred to as a distance-measuring system.

The left camera 12, the right camera 11, and the LiDAR range finder 110 are mounted into the sensor stay 201. As the LiDAR range finder 110 is disposed on the straight lines positioned between the right camera 11 and the left camera 12, the distance-measuring apparatus 100 can be downsized and produced at low cost. The spacing between the right camera 11 and the left camera 12 is referred to as the base-line length. When the base-line length is longer, the distance resolution at a remote point can be improved more easily. The base-line length needs to be shortened in order to downsize the distance-measuring apparatus 100. Preferably, the base-line length is shortened but high degree of precision is maintained.

The control board housing 202 accommodates a laser signal processor 240, a stereo image computation unit 250, a memory 260, and a micro processing unit (MPU) 270. As the laser signal processor 240 is separately arranged from the LiDAR range finder 110, the size of the LiDAR range finder 110 can be reduced. Due to this configuration, the LiDAR range finder 110 can be disposed between the right camera 11 and left camera 12 in the present embodiment.

In FIG. 9, the stereo image computation unit 250 and the laser signal processor 240 are configured by separate circuit boards. However, no limitation is indicated thereby, and the stereo image computation unit 250 and the laser signal processor 240 may be configured a circuit board in common. By so doing, the number of circuit boards is reduced, and the production cost can be reduced.

The elements on the sensor stay 201 side are described below in detail. As illustrated in FIG. 9, the left camera 12 includes a camera lens 211, a imaging device 212, and a sensor substrate 213. The extraneous light that has passed through the camera lens 211 is received by the imaging device 212, and is photoelectrically converted in a predetermined frame cycle. The signals that are obtained as a result of the above photoelectric conversion are processed by the sensor substrate 213, and a captured image is generated for each frame. The generated captured image is sequentially sent to the stereo image computation unit 250 as a comparison image.

The right camera 11 has a configuration similar to that of the left camera 12, and captures an image based on a synchronous control signal in synchronization with the left camera 12. The captured image is sequentially sent to the stereo image computation unit 250 as a reference image.

The LiDAR range finder 110 includes a light source driver 231, a laser beam source 232, and a projector lens 233. The light source driver 231 operates based on a synchronous control signal sent from the laser signal processor 240, and applies modulating electric current (light-source driving signal) to the laser beam source 232. Due to this configuration, the laser beam source 232 emits laser beams. The laser beams that are emitted from the laser beam source 232 are emitted to the outside through the projector lens 233.

In the present embodiment, it is assumed that an infrared semiconductor laser diode (LD) is used as the laser beam source 232, and near-infrared light with wavelengths of 800 nanometer (nm) to 950 nm is emitted as a laser beam. Moreover, it is assumed that the laser beam source 232 emits a laser beam having a pulsed waveform at prescribed time intervals according to the modulating electric current (light-source driving signal) applied by the light source driver 231. Further, it is assumed that the laser beam source 232 emits a pulsed laser beam having a short pulse width of about a few nanoseconds to several hundreds of nanoseconds at prescribed time intervals. However, no limitation is intended thereby, and the wavelengths of the laser beams or the pulse widths may be set differently. In some embodiment, other types of light emitting elements such as vertical-cavity surface-emitting lasers (VCSELs), organic electroluminescence (EL) elements, and LEDs may be used as a light source.

The pulsed laser beams that are emitted from the laser beam source 232 are emitted to the outside through the projector lens 233, and then an object existing in the irradiation direction of one of the laser beams is irradiated with some of the laser beams emitted through the projector lens 233. Note also that the laser beams that are emitted from the laser beam source 232 are approximately collimated by the projector lens 233. Accordingly, the irradiation area of the object is controlled to a predetermined minute area.

The LiDAR range finder 110 further includes a light-receptive lens 234, a light-receiving element 235, and a light-signal amplifier circuit 236. The laser beams that are emitted to the object existing in the irradiation direction of one of the laser beams uniformly scatter to all directions. Then, only the light components that are reflected and return in the same optical path as the laser beams that were emitted from the LiDAR range finder 110 are guided to the light-receiving element 235 through the light-receptive lens 234 as reflected light.

In the present embodiment, a silicon pin photodiode or an avalanche photodiode is used as the light-receiving element 235. The light-receiving element 235 photoelectrically converts the reflected light to generate a reflected signal, and the light-signal amplifier circuit 236 amplifies the generated reflected signal and then sends the amplified reflected signal to the laser signal processor 240. The reflected signal may be converted into a digital signal before output to the laser signal processor 240, or may be converted into a digital signal by the laser signal processor 240.

The elements on the control board housing 202 side are described below in detail. The laser signal processor 240 sends the reflected signal sent from the LiDAR range finder 110 and the distance data that is calculated based on the reflected signal to the stereo image computation unit 250. The laser signal processor 240 may detect a peak from the reflected signal to calculate and obtain the distance information. In the present embodiment, any one of the stereo image computation unit 250 and the laser signal processor 240 may calculate the distance information.

The stereo image computation unit 250 is configured by, for example, a dedicated integrated circuit such as a field programmable gate array (FPGA) and an application specific integrated circuit (ASIC). The stereo image computation unit 250 outputs a synchronous control signal for controlling the timing of capturing an image and the timing of laser-beam projection and laser-beam reception to the left camera 12, the right camera 11, and the laser signal processor 240.

The stereo image computation unit 250 generates a distance image based on a comparison image sent from the left camera 12, a reference image sent from the right camera 11, and a reflected signal sent from the laser signal processor 240. The stereo image computation unit 250 stores the generated distance image in the memory 260.

The memory 260 stores a distance image and a reference image generated by the stereo image computation unit 250. The memory 260 serves as a work area where the stereo image computation unit 250 and the MPU 270 performs various kinds of processes.

The MPU 270 controls the elements accommodated in the control board housing 202, and analyzes a disparity image stored in the memory 260. Moreover, the MPU 270 sends the distance image and the reference image to the ECU 190.

Problems in TOF Distance-measuring Method

In the TOF distance-measuring method implemented by the laser signal processor 240, signals are received as in a first equation given below.

$$P_r = \frac{A}{L^2} \cdot R_{Tgt} \cdot P_0 \qquad \text{First Equation}$$

$P_r$: Amount of Received Reflected Signal
L: Detection Distance to Object
$R_{Tgt}$: Reflectance Ratio of Object
$P_O$: Intensity of Light Emission from Light Emitter
A: Constant determined by Optical System or Mechanical System The distance can be measured based on the length of time between a point in time when a laser beam is emitted and a point in time when the laser beam is received after being reflected by an object. As understood from the first equation, the strength of the signal Pr received by the LiDAR range finder 110 is influenced by the square of the distance. For example, when it is assumed that the reflectance ratio $R_{Tgt}$ or $S_{snd}$ of a target object is the same and the distance L is doubled (for example, when the distance is doubled from 10 m to 20 m), the signal level is reduced to a quarter.

For example, Po may be enhanced, TFG may be improved, or Srcv may be increased in order to earn the distance range. However, when Po is enhanced, saturation may occur at a short-distance portion as the signal gets too strong. If such saturation occur, a peak may be lost and an error may occur, and the cost may also increase. When Srcv is increased, the size of a module may also increase. Even when TFG is improved, a dramatic improvement cannot be expected.

Figure 10A:
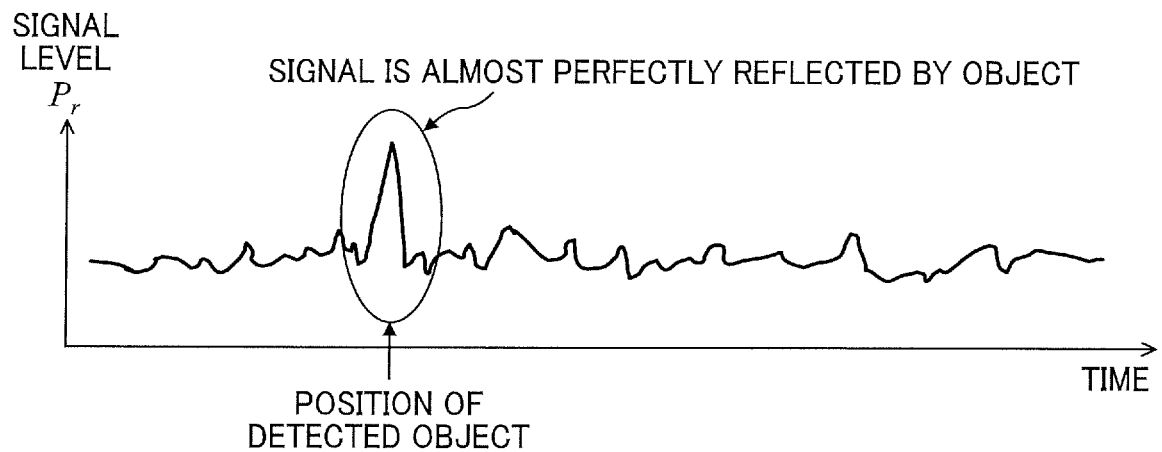
FIG. 10A and FIG. 10B are diagrams illustrating a difference in the signal level received at a close point and a remote point, according to an embodiment of the present disclosure.
Figure 10B:
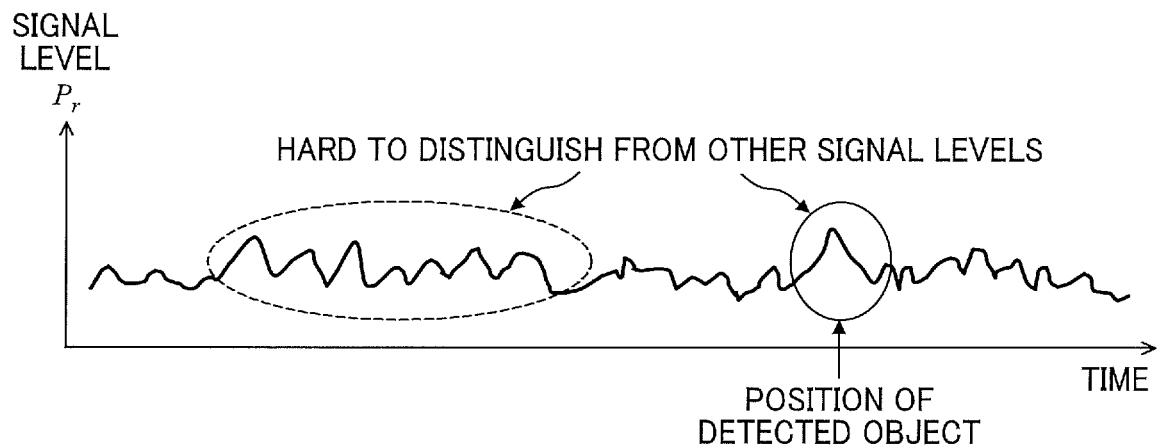

FIG. 10A and FIG. 10B are diagrams illustrating an example of a difference in signal level between a signal level received at a close point and a signal level received at a remote point.

FIG. 10A illustrates reflected signals obtained as light is reflected by close objects.

Each of the reflected signals indicates a peak of a signal Pr, and the rest of the signal Pr is noise. As illustrated in FIG. 10A, the signal levels of close objects are strong, and signals can be distinguished from noise when detected. The distance to an object is calculated based on the length of time taken until a reflected signal is detected. There are various kinds of methods to determine the level of a reflected signal based on the signal Pr. For example, the highest peak may be detected or a plurality of points equal to or higher than a threshold may be detected (multiple detection). Typically, a method in which a reflected signal is binarized with a threshold is adopted. By contrast, in the present embodiment, the reflected signal as illustrated in FIG. 10A is output to the stereo image computation unit as it is, or the reflected signal on which filtering or the like has been done is output to the stereo image computation unit. The stereo image computation unit converts the reflected signal into a cost, and performs a fusion between the obtained cost and the cost of block matching. Note also that the block matching may be simple matching instead of matching on a block-by-block basis. For example, matching may be performed on a pixel-by-pixel basis.

FIG. 10B illustrates a reflected signal obtained as light is reflected by a remote object. When the signal level of such a remote object is weak and the strength of its reflected signal is almost the same as that of noise, it is difficult to detect the reflected signal with any desired one of a method in which the highest peak is detected and a method in which a signal level equal to or higher than a threshold is detected.

Typically, a signal Pr whose level of signal is equal to or greater than a threshold is detected as a reflected signal in ascending distance order, or a peak position is detected. However, as illustrated in FIG. 10B, the substantial strength of a reflected signal is equivalent to the strength of noise that is detected in advance. Accordingly, when signal levels are viewed in its entirety, it is difficult to detect a reflected signal. Theoretically, the LiDAR range finder 110 has such a drawback as above. However, a principle fusion is adopted in the present embodiment, and thus the distance to an object at a long distance may be detected with practical precision as long as the peak is higher is slightly higher than the levels of noise.

Laser-beam Resolution of Laser Beams according to Present Embodiment

For example, the distance-measuring apparatus 100 according to the present embodiment is characterized by emitting a laser beam of low laser-beam resolution. Emission of a laser beam of low laser-beam resolution is described below with reference to FIG. 11A, FIG. 11B, FIG. 12A, FIG. 12B, and FIG. 12C.

Figure 11A:
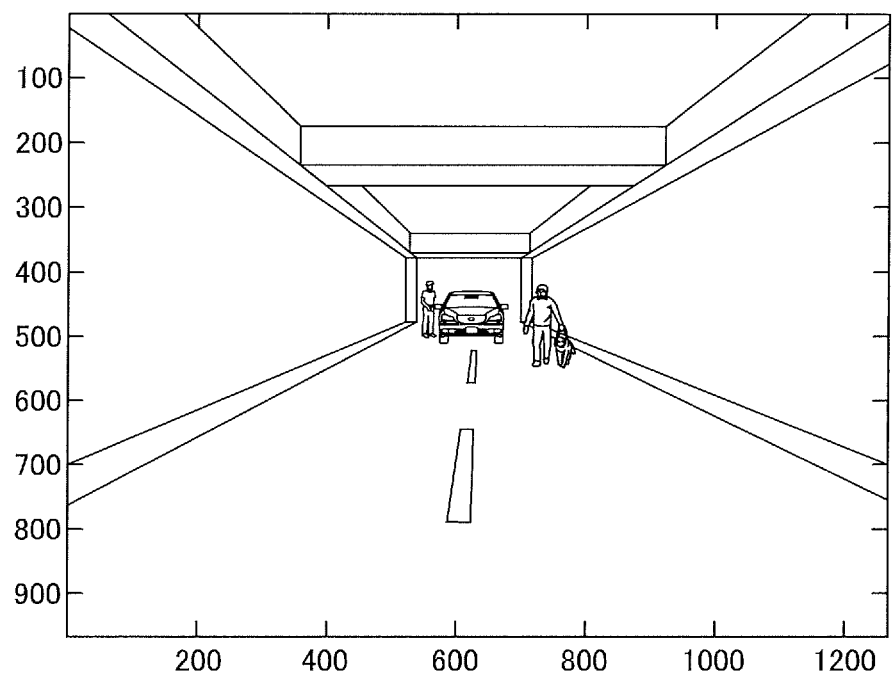
FIG. 11A and FIG. 11B are diagrams each illustrating a scene in which a laser beam is emitted, according to an embodiment of the present disclosure.
Figure 11B:
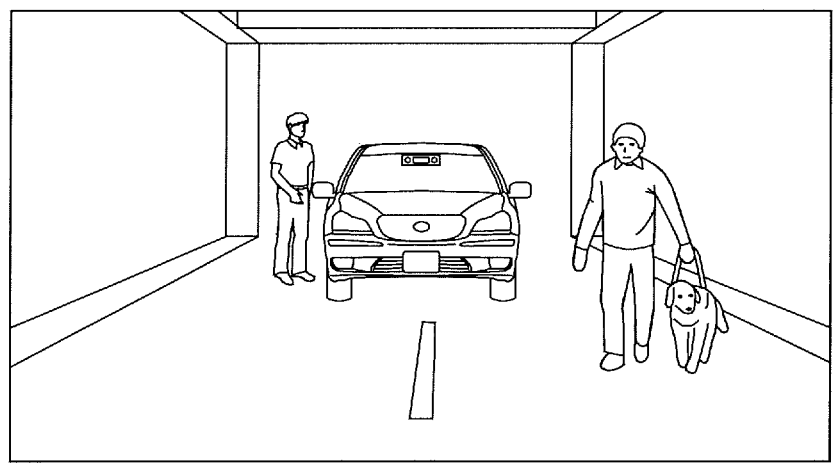

FIG. 11A and FIG. 11B are diagrams each illustrating a scene in which a laser beam is emitted, according to the present embodiment.

FIG. 11A is a diagram illustrating a scene in which a laser beam is emitted, according to the present embodiment.

FIG. 11B is a magnified view of FIG. 11A.

As described above, according to the present embodiment, the distance-measuring apparatus 100 irradiates an area including at least one object with a laser beam of low laser-beam resolution, and performs image processing using a reflected signal with multiple pulses to separate two or more objects that exist within a laser-beam resolution from each other with an appropriate plane that indicates the distance. In other words, the laser-beam resolution of the LiDAR is not necessarily high and may be low.

Figure 12A:
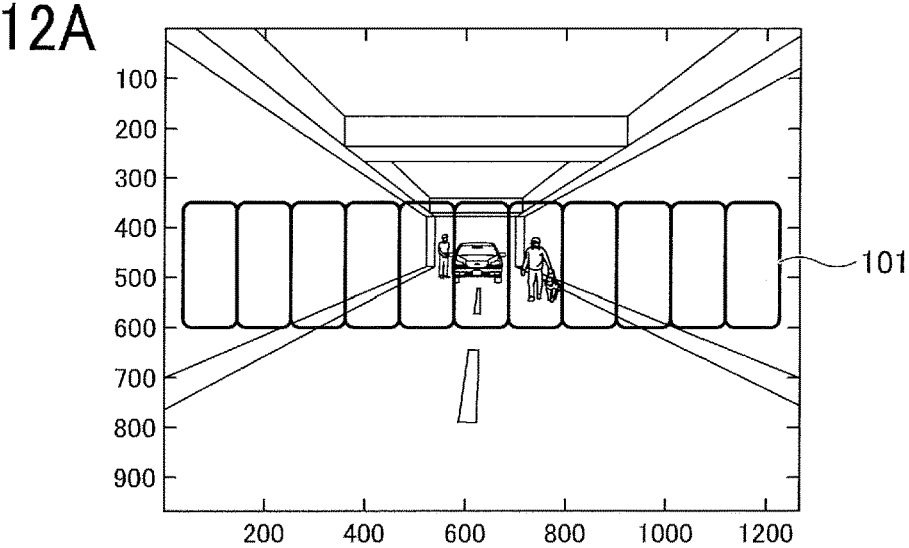
FIG. 12A, FIG. 12B, and FIG. 12C are diagrams each illustrating an image of irradiation when a laser beam of low laser-beam resolution is emitted, according to an embodiment of the present disclosure.
Figure 12B:
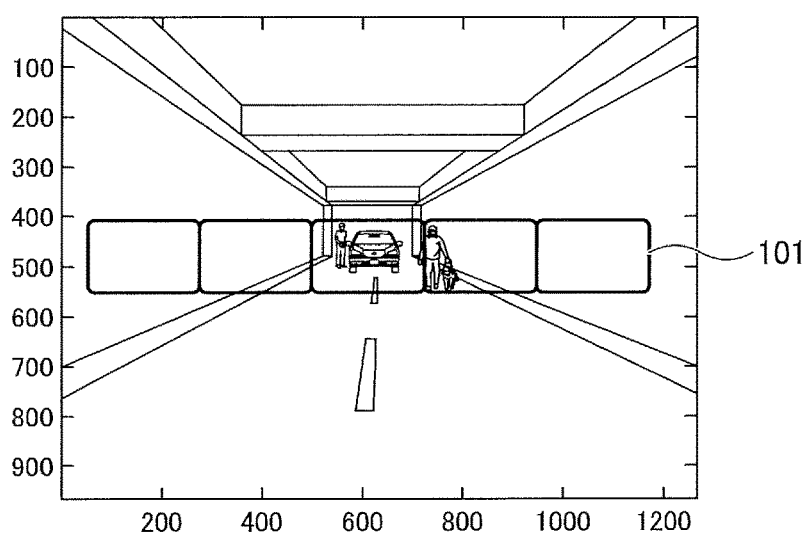
Figure 12C:
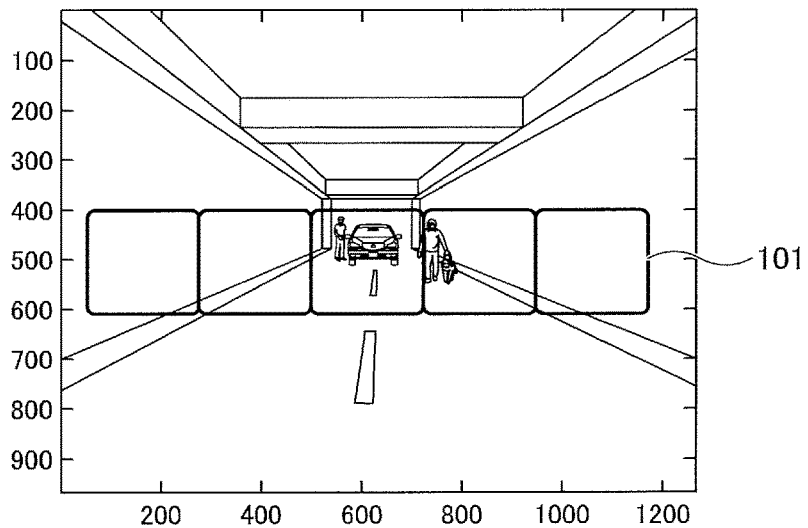

FIG. 12A, FIG. 12B, and FIG. 12C are diagrams each illustrating an image of irradiation when a laser beam of low laser-beam resolution is emitted, according to the present embodiment.

In FIG. 12A, each vertically-oriented rectangle indicates an irradiation field 101 of one laser beam.

In FIG. 12B, each horizontally-oriented rectangle indicates the irradiation field 101 of one laser beam.

In FIG. 12C, each roughly-drawn square indicates the irradiation field 101 of one laser beam.

As an object at a remote point is captured at an upper point of an image, a plurality of objects at varying distances tend to be included in one irradiation field 101 when the irradiation field is vertically oriented. Accordingly, a distance appears between two peaks in multiple pulses, and those peaks can easily be separated from each other. As a plurality of peaks can be detected, the planes each of which indicates the distance of a plurality of objects included in one irradiation field 101 can easily be separated from each other.

By contrast, when the irradiation field is horizontally oriented, there is little likelihood that a plurality of object at varying distances are included in one irradiation field 101, and it is expected that the number of peaks in one reflected signal will be reduced. As will be described later in detail, the peaks of a reflected signal are used in the principle fusion. For this reason, the processing load on the fusion operation can be lightened.

As described above, the glancing angle of a laser beam may be horizontally oriented or vertically oriented according to the present embodiment. Moreover, a horizontally-oriented irradiation field 101 and a vertically-oriented irradiation field 101 may exist in a mixed manner. Further, even if a reflected signal is extremely weak, it is expected that the magnitudes of peaks of the multiple pulses of the reflected signal (voltage value) can be separated from each other by surface on an object-by-object basis as long as each peak is slightly higher than the levels of noise.

A low laser-beam resolution is defined as below. A low laser-beam resolution refers to a laser beam whose at least one of the resolution in the vertical direction and the resolution in the horizontal direction exceeds two degrees. By emitting a laser beam of low laser-beam resolution, an image can be separated by surface at an appropriate distance. Regarding the laser-beam resolution according to the related art, for example, the resolution in the horizontal direction is about 0.1 to 0.4 degrees, and the resolution in the vertical direction is about 2 degrees. In other words, the laser-beam resolution in the distance-measuring apparatus 100 according to the present embodiment may be lower than the laser-beam resolution in the related art.

Figure 13A:
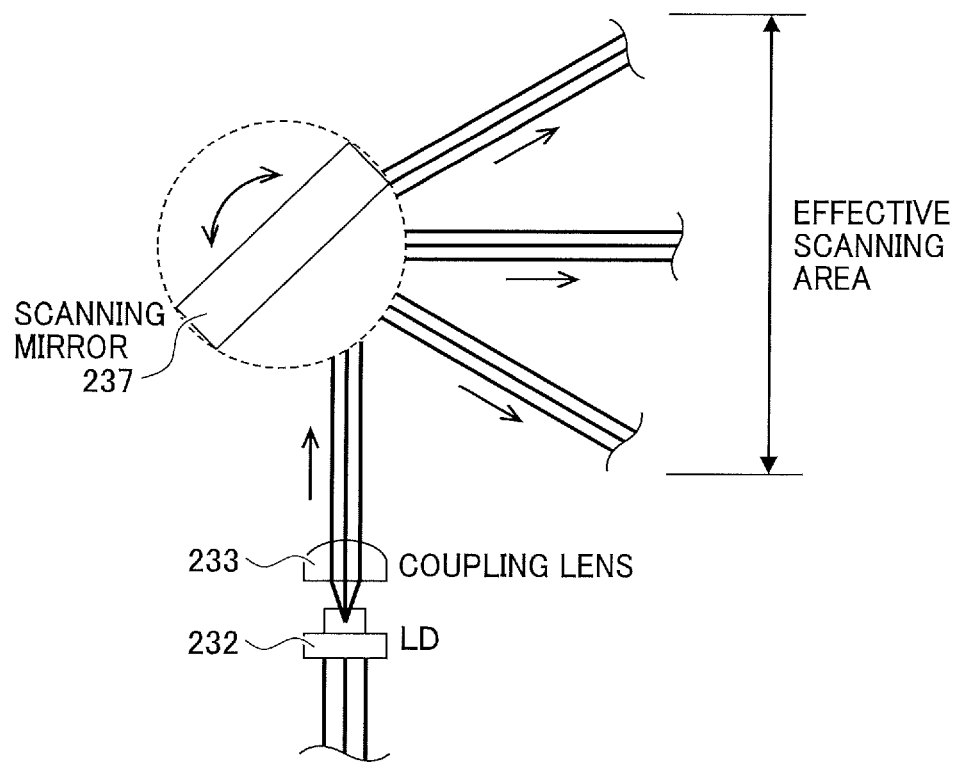
FIG. 13A and FIG. 13B are diagrams each illustrating a configuration of the irradiation unit of a LiDAR range finder in which a low laser-beam resolution as illustrated in FIG. 12A, FIG. 12B.
Figure 13B:
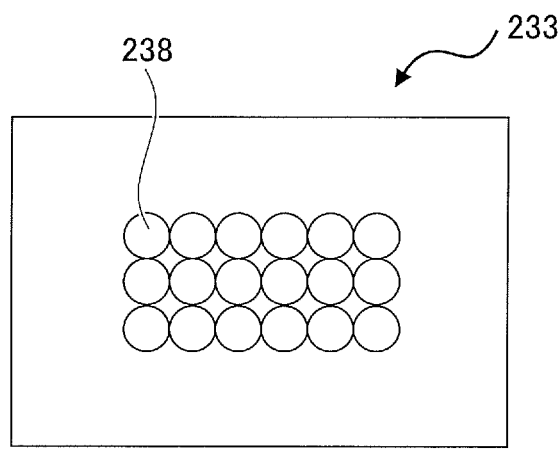

FIG. 13A and FIG. 13B are diagrams each illustrating a configuration of the irradiation unit of the LiDAR range finder 110 in which a low laser-beam resolution as illustrated in FIG. 12A, FIG. 12B, and FIG. 12C is implemented, according to the present embodiment.

As illustrated in FIG. 13A, the LiDAR range finder 110 has a scanning mirror 237 that deflects and scans the light emitted from the laser beam source 232 so as to be reflected towards an effective scanning area. For example, a micro-electromechanical system (MEMS) mirror in which the mirror unit is driven by MEMS may be used as the scanning mirror 237, and a polygon mirror that is rotated by a motor or other kinds of galvano mirror may be used as the scanning mirror 237.

The laser beams that are emitted from the laser beam source 232 pass through the projector lens 233 and reach the scanning mirror 237. The projector lens 233 is a coupling lens or a collimator lens, and performs optical adjustment so that the light beam is collimated. Typically, the distance between the laser beam source 232 and the projector lens 233 matches the focal length of the projector lens 233. By contrast, in the present embodiment, the distance between the laser beam source 232 and the projector lens 233 is made slightly longer than the focal length of the projector lens 233 in order to achieve a low laser-beam resolution. The degree of extension may experimentally be determined. In addition to a configuration where the focal length is adjusted, the projector lens 233 may be a concave lens that spreads a laser beam.

The port of the laser beam source 232 from which laser beams are emitted may be covered with a mask that has a vertically-oriented or horizontally-oriented slot to make the shape of the irradiation field vertically oriented or horizontally oriented. Alternatively, as illustrated in FIG. 13B, a plurality of laser diodes (LDs) 238 each of which is a point source of light may be arranged in a desired shape of irradiation field (vertically oriented, horizontally oriented, or square-shaped). In FIG. 13B, the multiple LDs 238 are horizontally oriented. Alternatively, the multiple LDs 238 may have a irradiation field of any desired shape such as a triangle or a circle.

Alternatively, for example, a method in which a coupling lens with different focal lengths in the vertical direction and the horizontal direction is used or a method in which various kinds of multiple lens are combined may be adopted.

Functional Configuration of Stereo Image Computation Unit

Figure 14:
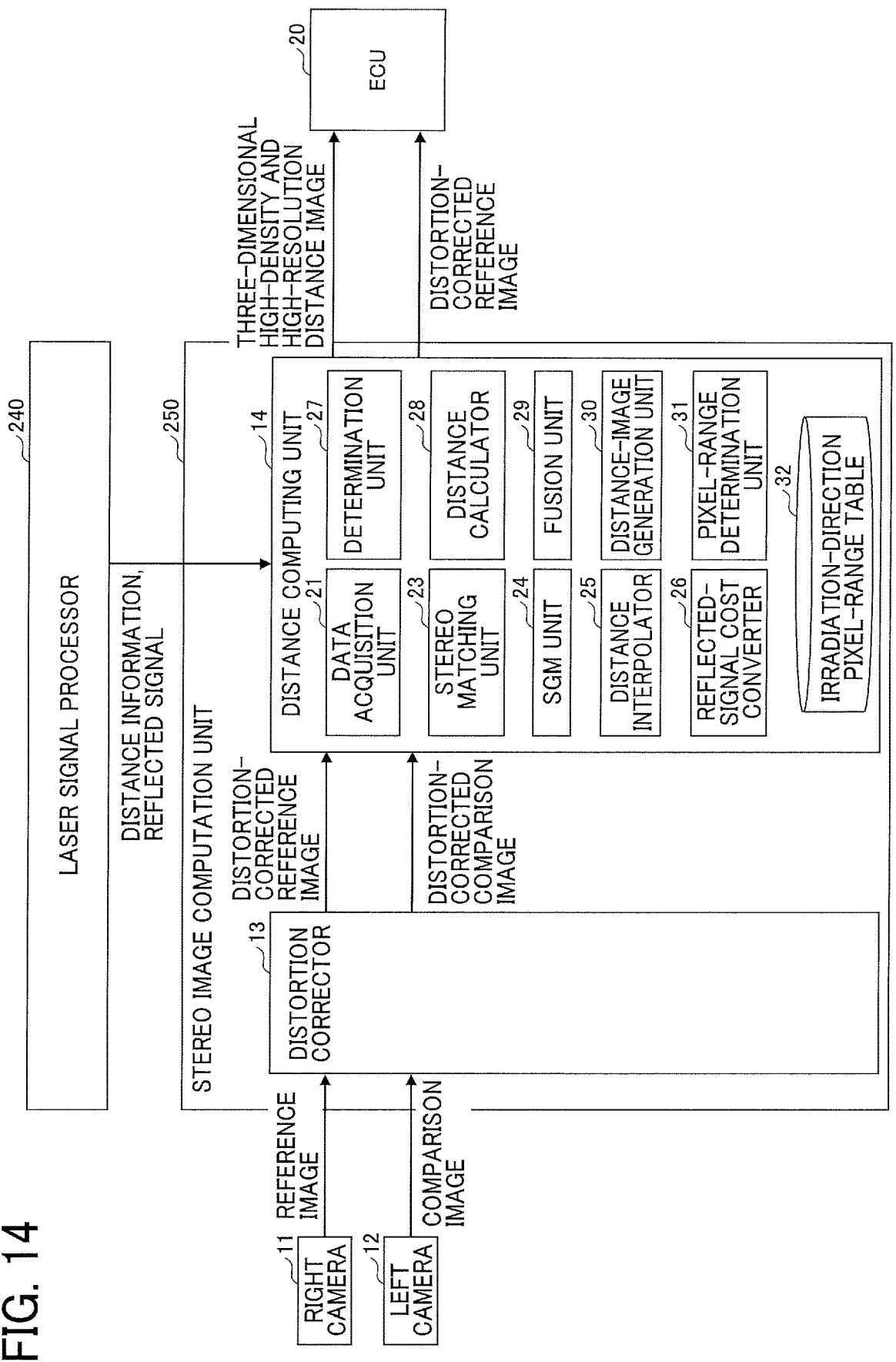
FIG. 14 is a diagram illustrating a configuration of a distance-measuring apparatus according to an embodiment of the present disclosure.

FIG. 14 is a block diagram illustrating the functions of the distance-measuring apparatus 100 according to the present embodiment.

In particular, FIG. 14 illustrates the functions of the stereo image computation unit 250 according to the present embodiment. As illustrated in FIG. 14, the stereo image computation unit 250 includes a distortion corrector 13 to which the reference images and comparison images obtained by the right camera 11 and the left camera 12, which together make up a stereo camera, are input, and a distance computing unit 14 that performs principle fusion. In the present embodiment, the images captured by the right camera 11 are used as reference images, and the images captured by the left camera 12 are used as comparison images.

The distortion corrector 13 and the distance computing unit 14 may be implemented by a dedicated electronic circuit, or a program that implements each element may be implemented as executed by a central processing unit (computer). In such cases, the stereo image computation unit 250 may serve as an information processing device. The stereo image computation unit 250 may serve as an image processing device that performs image processing.

The distortion corrector 13 performs general-purpose distortion correction on the reference images and comparison images. Due to this image correction, the reference images and the comparison images are corrected to eliminate all the differences just except disparities. The image correction is implemented by calibration that is performed in advance. For example, the left camera 12 and the right camera 11 capture an object for correction (for example, a chart in a checkerboard pattern) at the time of installation. A pair of images are compared with each other to generate a look up table (LUT) for geometric transformation in which the image data is converted so as to minimize an internal error factor in hardware such as the distortion in a lens of a camera, displacements in optical axis, displacements in focal length, and the distortion in an imaging device. The distortion corrector 13 performs image correction with reference to such a LUT.

The distance computing unit 14 calculates a disparity by applying algorithms such as block matching or semi-global matching (SGM) propagation to the reference images and comparison images. As will be described later in detail, the distance computing unit 14 performs a principle fusion where fusion is performed between the data obtained by the stereo camera unit 120 and the data obtained by the LiDAR range finder 110 at an early stage.

In order to achieve such functions, the distance computing unit 14 includes a data acquisition unit 21, a stereo matching unit 23, a semi-global matching (SGM) unit 24, a distance interpolator 25, a reflected-signal cost converter 26, a determination unit 27, a distance calculator 28, a fusion unit 29, a distance-image generation unit 30, and a pixel-range determination unit 31.

The data acquisition unit 21 obtains the irradiation direction, the distance information, and a reflected signal from the laser signal processor 240, for each one of the emitted laser beams. The reflected signal may be an analog signal or a digital signal. The distance data is not necessarily obtained.

The stereo matching unit 23 performs block matching on the reference images and the comparison images to calculate a disparity (obtain a disparity as a result of conversion). The SGM unit 24 performs the SGM (semi-global matching (SGM) propagation) to calculate a disparity. The distance interpolator 25 converts the cost of disparity space into a cost of metric space (Z-space), and further interpolates the distance at regular intervals.

The reflected-signal cost converter 26 converts a reflected signal into a LiDAR cost $C_{LI}(p, Z)$.

The fusion unit 29 performs a principle fusion. In other words, the fusion unit 29 performs a fusion between the stereo-matching cost $C_{ST}$ and the LiDAR cost $C_{LI}$, or performs a fusion between the synthesis cost Ls(p, d) and the LiDAR $C_{LI}(p, Z)$. As another way of performing a fusion, the fusion unit 29 performs a principle fusion to replace the distance that each pixel of an irradiation field has with the distance information that is obtained from the peak of the reflected signal output from the laser signal processor 240.

The distance calculator 28 detects a peak from the reflected signal to calculate the distance at which the peak is detected based on the reflected signal. In other words, the distance calculator 28 of the stereo image computation unit 250 can calculate the distance information based on a threshold or the like that is different from the values used on the laser signal processor 240 side. However, the distance information that is sent from the laser signal processor 240 may be used just as it is for processing. In such a configuration, the distance calculator 28 may be omitted.

The pixel-range determination unit 31 refers to an irradiation-direction pixel-range table 32, and determines a pixel range for each one of the laser beams based on the irradiation direction.

The determination unit 27 performs some determinations as follows.

(i) Whether there is a distance equivalent to the distance information calculated and obtained by the distance calculator 28 in a pixel range is determined. When there is a distance equivalent to the distance information calculated and obtained by the distance calculator 28 in a pixel range, the corresponding pixel is determined.

(ii) Whether a reflected signal has a peak and the peak corresponds to the distance information that is equivalent to the distance of a pixel obtained by performing block matching is determined.

As will be described later in detail, these determinations as in (i) and (ii) are used for the principle fusion according to the present embodiment.

The distance-image generation unit 30 generate a distance image where the distance to each one of the pixels obtained in the principle fusion is associated with corresponding one of the pixels of a reference image.

The configuration as illustrated in FIG. 14 is given by way of example, and no limitation is indicated thereby. For example, the laser signal processor 240 and the stereo image computation unit 250 may be combined together. Alternatively, the laser signal processor 240 may have some of the functions of the stereo image computation unit 250. Alternatively, the ECU 190 may have some of or the entirety of the functions of the stereo image computation unit 250.

Principle of Distance Measurement by Stereo Camera

The functions of the stereo matching unit 23, the SGM unit 24, the distance interpolator 25, the reflected-signal cost converter 26, the distance calculator 28, the fusion unit 29, and the pixel-range determination unit 31 of the distance computing unit 14 are described below in detail.

Stereo Matching Unit

Figure 15A:
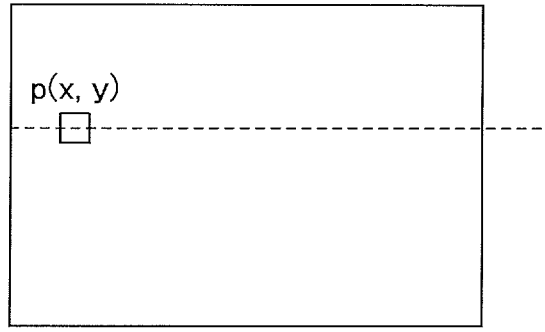
FIG. 15A and FIG. 15B are diagrams illustrating block matching according to an embodiment of the present disclosure.

FIG. 15A is a diagram in which a base pixel is indicated on a base image.

Figure 15B:
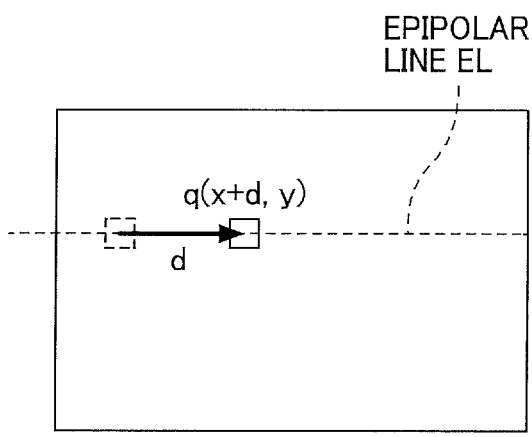

FIG. 15B is a diagram in which an amount of shift (i.e., amount of displacement) is calculated while sequentially shifting a candidate pixel on a comparison image that corresponds to the base pixel of FIG. 15A.

Figure 16:
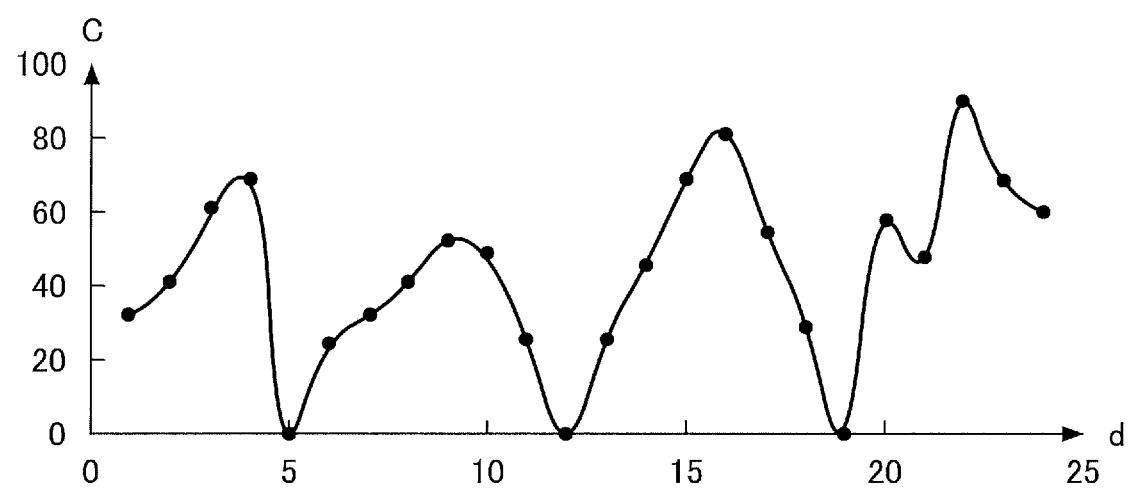
FIG. 16 is a graph in which a cost value is indicated for each degree of the amount of shift, according to an embodiment of the present disclosure.

FIG. 16 is a graph in which the cost value is indicated for each degree of the amount of shift, according to the present embodiment.

In the present embodiment, the corresponding pixel indicates a pixel of a comparison image that is most similar to the base pixel of a base image.

As illustrated in FIG. 15A and FIG. 15B, the cost C(p, d) of each candidate pixel q(x+d, y) that corresponds to the base pixel p(x, y) is calculated based on the multiple brightness values of a specific base pixel p(x, y) in a reference image and a plurality of candidate pixels q(x+d, y), which corresponds to the base pixel p(x, y), on an epipolar line drawn on a comparison image. "d" in FIG. 15B indicates the amount of shift (i.e. amount of displacement) of the candidate pixel q that corresponds to the base pixel p. In the present example embodiment, the amount of shift is indicated on a pixel-by-pixel basis. In other words, the stereo-matching cost $C_{ST}(p, d)$ that indicate the degree of dissimilarity in brightness value between the candidate pixels q(x+d, y) and the base pixel p(x, y) are calculated while sequentially shifting the candidate pixels q(x+d, y) on a pixel-by-pixel basis within a prescribed range (for example, 0<d<25), as illustrated in FIG. 15A and FIG. 15B. A known method such as the sum of absolute difference (SAD) may be applied to a method of calculating of the stereo-matching cost $C_{ST}$. In this configuration, the stereo-matching cost $C_{ST}$ indicates the degree of dissimilarity.

As illustrated in FIG. 16, the stereo-matching cost $C_{ST}(p, d)$ as calculated as above can be depicted in a graph of cost curve where a collection of the stereo-matching costs $C_{ST}$ are indicated for each degree of amount of shift "d." As illustrated in FIG. 16, the stereo-matching cost $C_{ST}$ becomes 0 (zero) when the amount of shift "d" is 5, 12, and 19, and thus a minimum value cannot be calculated. As described above, it is difficult to obtain a minimum value for the stereo-matching cost $C_{ST}$ when an object with a little texture is observed.

SGM Unit

A distance-measuring method in which SGM is used is described below with reference to FIG. 17 and FIG. 18. The SGM is adopted to precisely derive the disparity value even from an object with a little texture. In the SGM, a high-density disparity image is derived based on a reference image. As the detailed information of a road or the like with a little texture can be expressed in the SGM, more precise distance measuring is achieved.

In the SGM, a disparity value is not calculated immediately after a cost value that indicates the degree of dissimilarity is calculated. Instead, a synthesis-cost value that indicates the degree of dissimilarity in synthesis is further calculated to derive a disparity value after the cost value is calculated. By so doing, a disparity image (high-density disparity image) in which the disparity values are obtained for almost all the pixels is finally derived.

Figure 17:
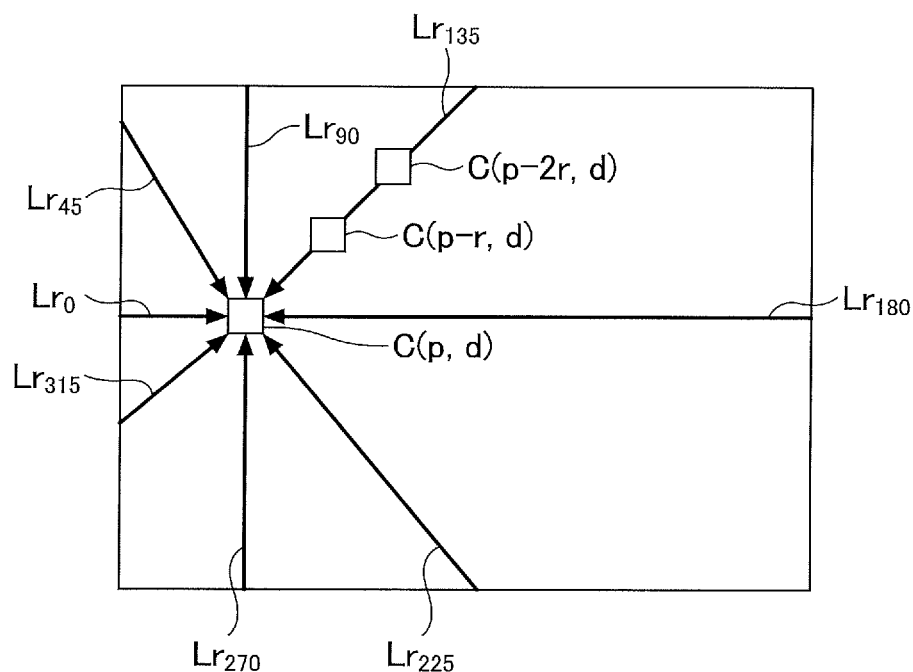
FIG. 17 is a schematic view of how a synthesis cost is derived according to an embodiment of the present disclosure.

FIG. 17 is a schematic view of how a synthesis cost is derived according to the present embodiment.

Figure 18:
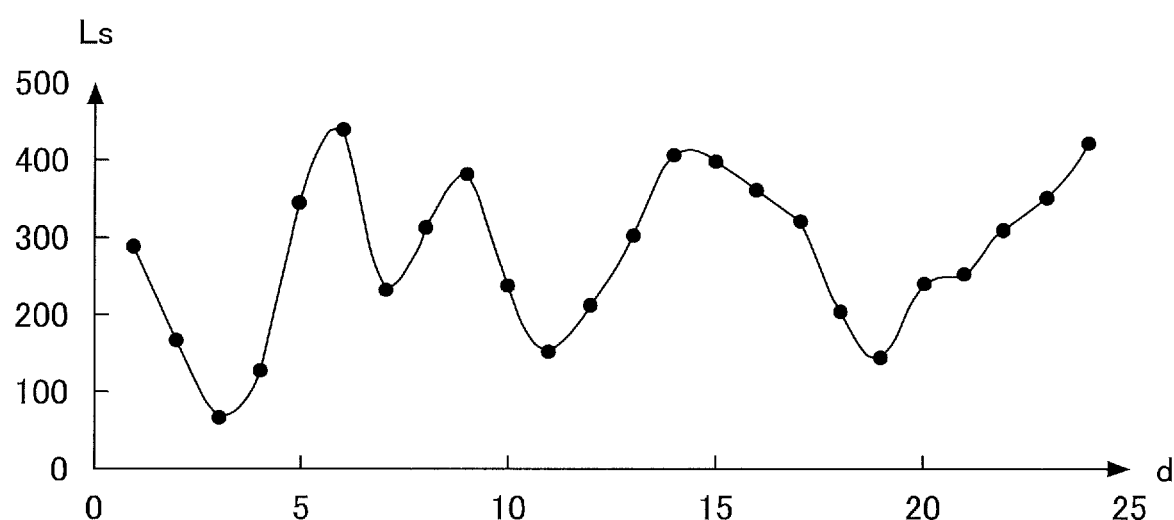
FIG. 18 is a graph of synthesis-cost curve indicating the synthesis cost for each one of the disparity values, according to an embodiment of the present disclosure.

FIG. 18 is a graph of synthesis-cost curve indicating the synthesis cost for each one of the disparity values, according to the present embodiment.

In addition to the calculation of the stereo-matching cost $C_{ST}(p, d)$, in the method of calculating a synthesis-cost according to the present embodiment, the cost values calculated for a plurality of base pixels around the prescribed base pixel p(x, y) are aggregated with the stereo-matching cost $C_{ST}(p, d)$ to calculate a synthesis-cost value Ls(p, d).

More detailed explanation about a method of calculating a synthesis-cost value is given below. Firstly, path cost values Lr(p, d) need to be calculated prior to calculating a synthesis-cost value Ls(p, d). The path cost values Lr(p, d) are calculated as in the second equation given below, and the synthesis cost Ls is calculated as in the third equation given below.

Second Equation $$Lr(p,d)=C(p,d)+\min\{(Lr(p-r,d),Lr(p-r,d-1)+P1,Lr(p-r,d+1)+P1,Lr\min(p-R)+p2\}$$

In the second equation, "r" indicates a directional vector of aggregation, and includes the two components of X-direction and Y-direction. "min{ }" is a function to calculate a minimum value. "Lmin(p−r)" indicates the minimum value of Lr(p−r, d) when the amount of shift "d" is varied in the coordinates where "p" is shifted to "r" by one pixel. As indicated in the second equation, "Lr" is recursively used. "P1" and "P2" are fixed parameters that are determined in advance by experiment. "P1" and "P2" are designed such that the disparity values Δ of the neighboring base pixels in the path become consecutive. For example, P1=48 and P2=96.

As illustrated in the second equation, Lr(p, d) are calculated by adding minimum values for the path cost values Lr of pixels in r directions illustrated in FIG. 17 to the cost value C for the base pixel p(x, y). As Lr are calculated for a plurality of pixels in r-directions as described above, Lr for the end pixels in the r-directions of the base pixel p(x, y) are firstly calculated and then Lr for the other pixels are calculated in the r-directions.

Then, as illustrated in FIG. 17, Lr0, Lr45, Lr90, Lr135, Lr180, Lr225, Lr270, and Lr315 in eight directions are obtained, and a synthesis-cost value Ls is finally calculated as in the third equation.

$$L_s(p, d) = \sum_8 Lr(p, d) \qquad \text{Third Equation}$$

As illustrated in FIG. 18, the synthesis-cost values Ls(p, d) as calculated above can be depicted in a graph of synthesis-cost curve where the synthesis-cost values Ls(p, d) are indicated for each degree of amount of shift "d." As illustrated in FIG. 18, the synthesis-cost value Ls has the minimum value when the amount of shift "d" is 3. Accordingly, it can be calculated as a disparity value Δ=3.

In the example embodiment as described above, the number of paths "r" is eight. However, no limitation is intended thereby. For example, the eight directions may be further divided by two or three into sixteen directions or twenty-four directions, respectively.

In the example embodiment as described above, the cost C is indicated as the "degree of dissimilarity." However, no limitation is indicated thereby, and the cost C may be indicated as the "degree of similarity" as the reciprocal of dissimilarity. In such cases, a known method such as the normalized cross-correlation (NCC) is applied to the method of calculating the cost C, and the disparity value A where the synthesis cost Ls becomes maximum is obtained and the disparity value A where the synthesis cost Ls becomes minimum is not obtained. Alternatively, the cost C may be indicated as the "degree of match" that includes both the degree of dissimilarity and the degree of similarity.

Note also that the semi-global matching (SGM) may be performed before performing a fusion, or may be performed after the fusion is performed. Alternatively, the SGM may be not at all performed.

Distance Interpolator

The distance interpolator 25 converts the disparity space into Z-space (metric space) in order to perform a fusion between the synthesis cost Ls(p, d) and the reflected signal detected by the LiDAR range finder 110.

Figure 19:
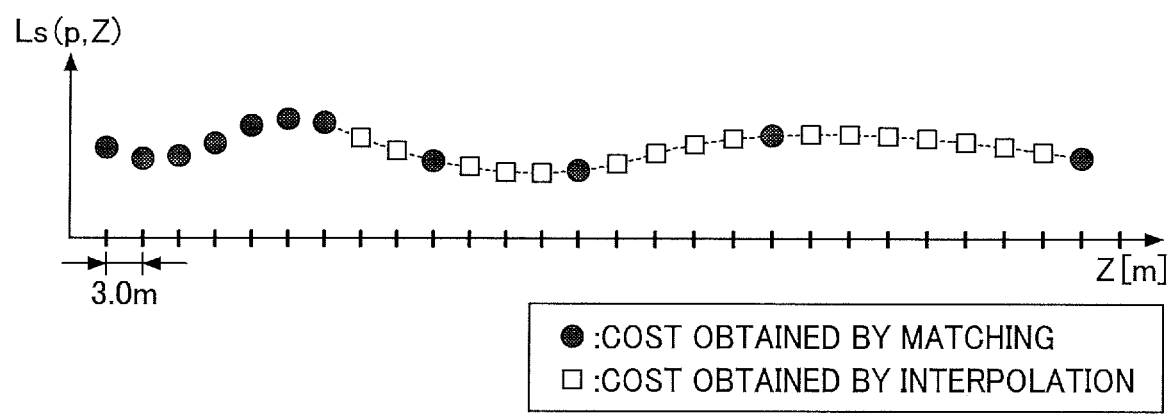
FIG. 19 is a diagram illustrating the synthesis cost of metric space obtained by converting the synthesis cost of disparity space, according to an embodiment of the present disclosure.

FIG. 19 is a diagram illustrating the synthesis cost Ls(p, Z) obtained by converting the synthesis cost Ls(p, d), according to the present embodiment.

In FIG. 19, the cost of disparity space that is obtained by the SGM is converted into the synthesis cost Ls(p, Z) in the Z-space. As understood from an equation indicating the relation between a disparity d and a distance Z (Z=BF/d), synthesis costs Ls(p, Z) can not be obtained at equal intervals in the Z space.

In order to handle such a situation, the fusion unit 29 interpolates the cost obtained by block matching at regular intervals. In FIG. 19, each of the circles indicates the cost obtained by block matching, and each of the rectangles indicates the cost obtained by interpolation. The interpolation method is satisfactory as long as it is suitable for curve fitting, and for example, the parabolic fitting, a high-degree polynomial, and a spline curve can be applied to the interpolation method. In FIG. 19, the synthesis cost Ls(p, Z) is calculated by interpolation, for example, for every three meters.

In the above example embodiment, interpolation is performed for every three meters. However, no limitation is indicated thereby. One example way of determining the interval is to make the interval be equivalent to the distance resolution of the LiDAR device.

Reflected-signal Cost Converter

Figure 20A:
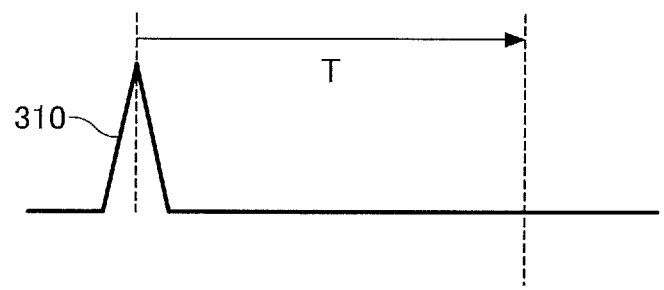
FIG. 20A, FIG. 20B, and FIG. 20C are diagrams illustrating a method of calculating a LiDAR cost, according to an embodiment of the present disclosure.
Figure 20B:
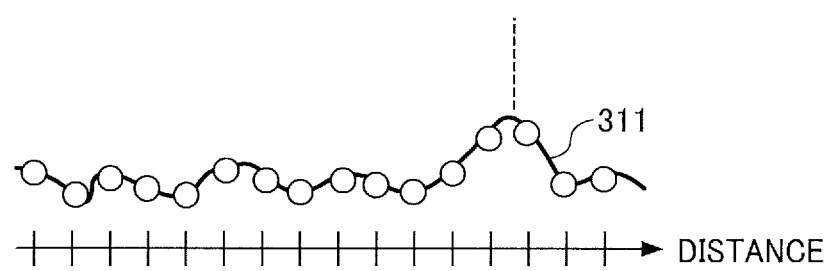
Figure 20C:
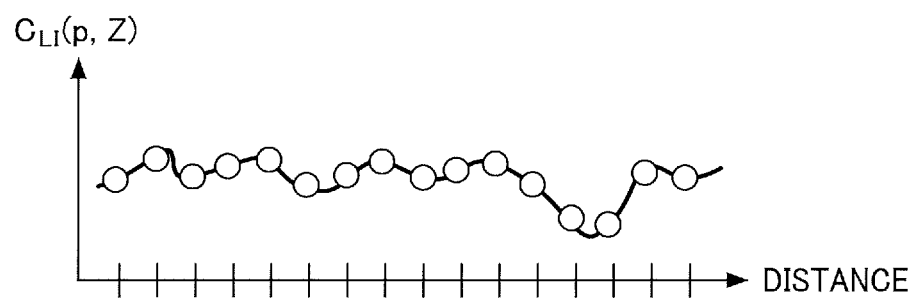

FIG. 20A, FIG. 20B, and FIG. 20C are diagrams illustrating a method of calculating a LiDAR cost $C_{LI}(p, Z)$ according to the present embodiment.

FIG. 20A is a diagram schematically illustrating the timing at which a pulse of the laser beam 310 is emitted, according to the present embodiment.

FIG. 20B is a diagram illustrating the reflected signals 311 that are sampled in chronological order, according to the present embodiment.

FIG. 20C is a diagram illustrating the LiDAR costs $C_{LI}(p, Z)$ according to the present embodiment.

Once the laser beam 310 is emitted, the LiDAR range finder 110 starts sampling the reflected signals 311 at regular time intervals.

The duration in time in which the LiDAR range finder 110 continues performing the sampling in response to one-time emission of the laser beam 310 is determined in advance. For example, such duration in time corresponds to the distance of about 100 to 200 m.

The relation between the reflected signals 311 and the duration in time as illustrated in FIG. 20B indicates that the probability that an object exists at that distance is higher as the value of the reflected signal 311 is greater. On the other hand, the LiDAR cost $C_{LI}(p, Z)$ is minimized at the distance where the probability that at least one object exists is the highest. For this reason, when a fusion is to be performed, preferably, the waveform of the reflected signal 311 is changed in such a manner that the probability that at least one object exists increases as the value of the reflected signal 311 is smaller. Under these circumstances, the reflected-signal cost converter 26 converts the reflected signals 311 as illustrated in FIG. 20B into the LiDAR cost $C_{LI}(p, Z)$ as illustrated in FIG. 20C. Although there are various kinds of methods to perform conversion, it is satisfactory when the LiDAR cost $C_{LI}(p, Z)$ is minimized at the distance where the reflected signal 311 takes the greatest value. For the sake of simplification, for example, conversion may be performed to invert the magnitude of the reflected signal 311 around a certain value of the reflected signal 311.

Alternatively, the values of the reflected signal 311 may be converted using a function that decreases the values of the reflected signal 311 as the value of the reflected signal 311 is greater.

In FIG. 20A, FIG. 20B, and FIG. 20C, the waveform of the reflected signal 311 is converted in such a manner that the probability that at least one object exists increases as the value of the reflected signal 311 is smaller. However, the stereo image computation unit 250 may modify the waveform of the synthesis cost Ls or the stereo-matching costs $C_{ST}$ so as to be maximized at the distance where the probability that at least one object exists is the highest.

Pixel-range Determination Unit

In FIG. 12A, FIG. 12B, and FIG. 12C, the irradiation field of one laser beam is illustrated, and each irradiation field corresponds to a plurality of pixel ranges. Assuming that the irradiation field of each laser beam is fixed (in other words, each laser beam is emitted in almost the same direction even when a reference image is switched), the pixel range can be determined when the irradiation direction is determined. As it can be assumed that the irradiation direction of each laser beam on one reference image is almost the same even when a reference image is switched, each one of the irradiation directions can be associated with a pixel range in advance.

First Table

| IRRADIATION DIRECTION | PIXEL RANGE |
| --- | --- |
| $\phi 1, \lambda 1$ | (Xs1, Ys1) (Xe1, Ye1) |
| $\phi 2, \lambda 2$ | (Xs2, Ys2) (Xe2, Ye2) |
| $\phi 3, \lambda 3$ | (Xs3, Ys3) (Xe3, Ye3) |
| . | . |
| . | . |
| . | . |

The irradiation-direction pixel-range table 32 is described below with reference to a first table given above. The first table illustrates an example of the irradiation-direction pixel-range table 32. In the irradiation-direction pixel-range table 32, the irradiation directions and the pixel ranges are associated with each other. $\phi$ and $\lambda$ in the irradiation direction indicate the glancing angle in the direction of latitude and the glancing angle in the direction of longitude, respectively. (Xs, Ys) and (Xe, Ye) in the column of pixel range indicate the coordinates of the vertices of a reference image at the opposite angle.

By referring to the irradiation-direction pixel-range table 32, the pixel-range determination unit 31 can determine the pixel range based on the irradiation direction obtained from the LiDAR range finder 110.

Rather than determining the relation between the irradiation direction and the pixel range in advance as in the first table, the pixel-range determination unit 31 may calculate the pixel range based on the irradiation direction. As the pixel that the laser beam that is emitted in a particular irradiation direction hits can be specified based on the irradiation direction, the pixel range can be calculated and obtained by adding a margin depending on the shape of an irradiation field to the specified pixel on the top and bottom sides and the right and left sides.

Distance Calculator

Figure 21:
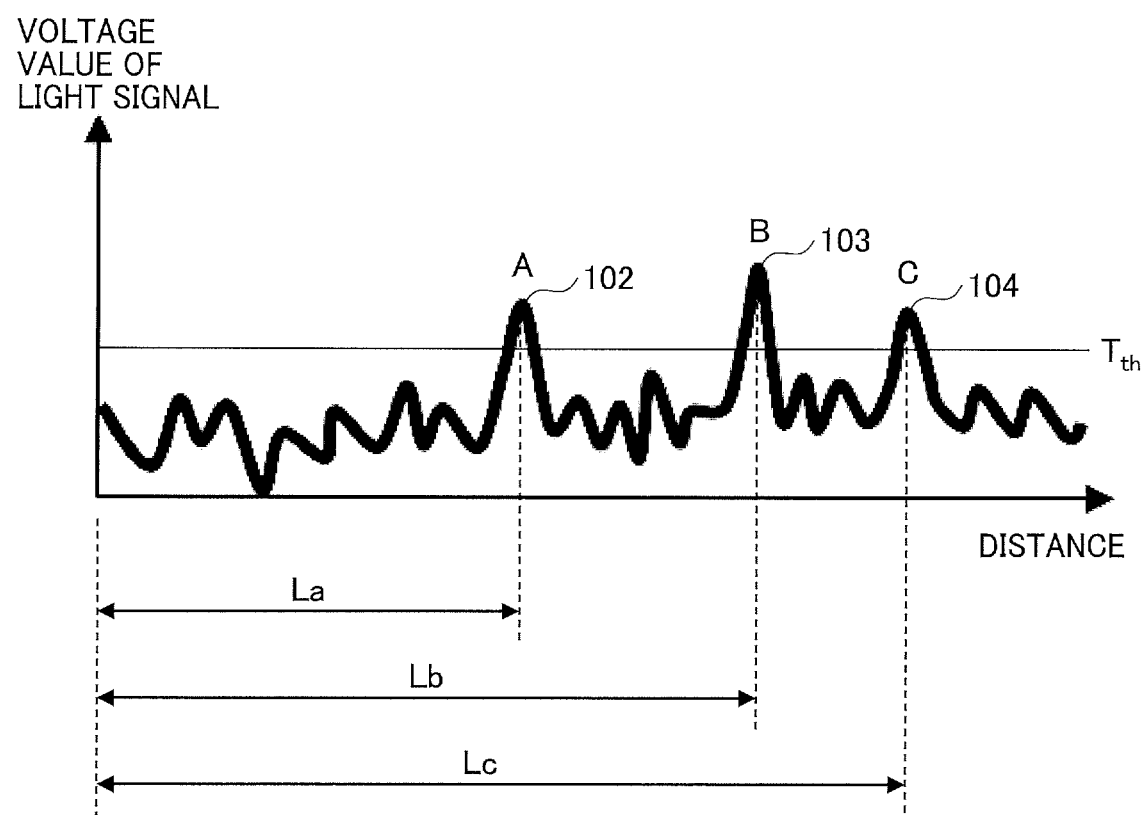
FIG. 21 is a diagram illustrating the distance information calculated and obtained by a distance calculator, according to an embodiment of the present disclosure.

FIG. 21 is a diagram illustrating the distance information calculated and obtained by the distance calculator 28, according to the present embodiment.

The distance calculator 28 determines a length of time T where the reflected signal takes a value equal to or greater than a threshold Tth, and calculates the distance based on the determined length of time T. For example, as illustrated in FIG. 21, when a reflected signal whose voltage value is equal to or greater than the threshold Tth is detected at three distances, three distances La, Lb, and Lc are calculated based on the speed of light and the length of time T it takes from a point in time when a laser beam is emitted until a point in time when a peak is observed (see FIG. 20A, FIG. 20B, and FIG. 20C).

Distance to Object=Speed of Light×T/2

As described above, the distance calculator 28 can convert the length of time T into distance information.

Alternatively, the distances of high-order N peaks in descending order of the value may be calculated without using any threshold. Due to such a configuration, an object at a long distance can be detected.

Fusion Unit

Typically, the fusion unit 29 adopts one of the two methods given below to perform a fusion (principle fusion) between the data obtained by the LiDAR range finder 110 and the data obtained by a stereo camera. In one of the two methods, a fusion is performed based on the cost. In the other one of the two methods, the distance to each pixel obtained by performing block matching is replaced with the distance information detected by the LiDAR range finder 110. Each of these two methods is an example of the principle fusion according to the present embodiment.

Fusion based on Cost

Firstly, how a fusion is performed based on a cost is described below. The fusion unit 29 performs a fusion between the synthesis cost Ls(p, Z) and the LiDAR cost $C_{LI}$(p, Z) to calculate a cost C(p, Z). Alternatively, the fusion unit 29 can perform a fusion between the stereo-matching cost $C_{ST}$(p, Z) and the LiDAR cost $C_{LI}$(p, Z) before the semi-global matching (SGM) is performed.

FIG. 22A, FIG. 22B, and FIG. 22C are schematic diagrams of a fusion between synthesis costs Ls(p, Z) and LiDAR costs $C_{LI}$(p, Z), according to the present embodiment.

FIG. 22A illustrates the LiDAR costs $C_{LI}$(p, Z) according to the present embodiment.

FIG. 22B illustrates the synthesis costs Ls(p, Z) according to the present embodiment.

Firstly, the fusion unit 29 multiplies each one of the LiDAR costs $C_{LI}$(p, Z) by a coefficient A, and multiplies each one of the synthesis costs Ls(p, Z) by a coefficient B. Then, the fusion unit 29 adds up each pair of the obtained values at the same distance. Due to the interpolation performed for the synthesis costs Ls(p, Z) as described above, the costs are obtained at almost the same distances between the synthesis costs Ls(p, Z) and the LiDAR costs $C_{LI}$(p, Z). When necessary, interpolation may also be performed for the LiDAR costs $C_{LI}$(p, Z) in a similar manner.

Due to this configuration, as illustrated in FIG. 22C, a fusion can be performed between the synthesis cost Ls(p, Z) and the LiDAR cost $C_{LI}$(p, Z).

Such a fusion can be expressed in an equation as given below.

Fourth Equation $$C(p,Z)=A \times C_{LI}(p,Z)+B \times Ls(p,Z)$$

A: Coefficient (Weight) of LiDAR Cost

B: Coefficient (Weight) of Synthesis Cost Ls

The coefficients A and B determine whether the LiDAR costs are to strongly influence the fusion or the synthesis costs Ls(p, Z) are to strongly influence the fusion. As the LiDAR costs and the synthesis costs Ls(p, Z) have different desirable conditions that improve the level of precision, the coefficients A and B can be determined in an experimental manner. Alternatively, the coefficient A and the coefficient B may be set based on a table in which the coefficients A and B are determined in advance for different environmental conditions (e.g., a time zone, weather, and current location). As the stereo camera unit 120 performs object recognition on a reference image, a captured object can be identified for each area of reference image. Accordingly, the coefficient A and the coefficient B may be switched for each one of the areas.

Fusion by Pixel Replacement

A fusion that is performed by replacing pixels is described below. The fusion unit 29 replaces the distance to each pixel obtained by performing block matching with the distance data that is calculated based on the reflected signal.

Figure 23:
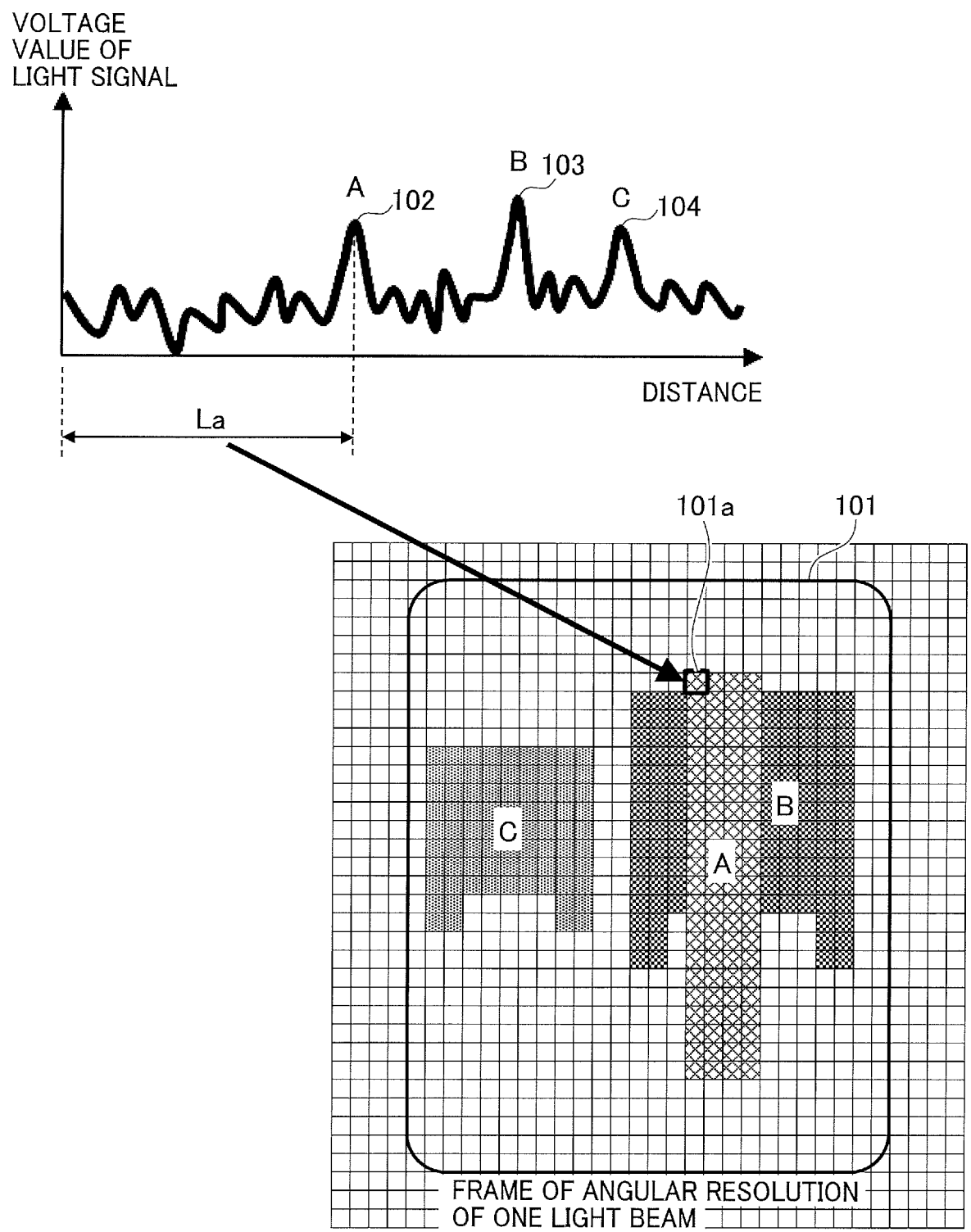
FIG. 23 is a diagram illustrating pixel replacement according to the present embodiment.

FIG. 23 is a diagram illustrating pixel replacement according to the present embodiment.

One or more objects (or no object) may exist in the irradiation field 101 irradiated with one laser beam. It is expected that a peak is included in the reflected signal to be measured by the LiDAR range finder 110 as the laser beam is reflected by such one or more objects. Accordingly, when the reliability of the reflected signal is high, the accuracy of the distance to each pixel can be improved by replacing the distance to each pixel obtained by performing block matching with the distance as indicated by the peak.

As illustrated in FIG. 23, three peaks 102 to 104 are detected from a reflected signal, and it is assumed that the distance indicated by the peak 102, which one of the peaks 102 to 104, is La. Note that the distance La is calculated by the distance calculator 28. When there is a pixel whose distance is close the distance La in the irradiation field 101, it is expected that the distance to that pixel is equivalent to the distance La. For example, the fusion unit 29 compares the distances La to Lc that are calculated based on the reflected signal with the distance to each pixel of the irradiation field 101, and the distance to each pixel obtained by performing block matching is replaced with the distance La when the distances La to Lc are equivalent to the distance to each pixel of the irradiation field 101. In the example of FIG. 23, the distance of a pixel 10a on which a part of an object A is captured is replaced with the distance La.

By so doing, the distances of the pixels whose originally-indicated distances are equivalent to the distance La are flattened to the fixed distance La, and separation can easily be achieved by surface.

Instead of simply replacing the distance obtained by performing block matching with the distance that corresponds to a peak of a reflected signal, these distances may be weighted and combined. In other words, such a combined distance may be calculated as follows.

Combined Distance=α×Distance obtained by performing Block Matching+β×Distance corresponding to Peak of Reflected Signal Note that α+β=1.

For example, the fusion unit 29 determines α and β as follows. The fusion unit 29 assumes that the reliability of β is higher as the level of the peak is higher, and determines β based on the level of the peak of the reflected signal. α is calculated by "1-β." In such a configuration, a table in which the peak levels of a reflected signal are associated with β is prepared.

Alternatively, the fusion unit 29 may assume that the reliability of the obtained distance is higher as the distance obtained in the block matching is smaller, and may determine α based on the distance. β is calculated by "1-α." In such cases, a table in which the distance to each pixel is associated with α is prepared.

Alternatively, α and β may separately be determined in a similar manner, and α and β may be adjusted such that the sum of α and β becomes 1. For example, when α and β are determined to be 0.6 and 0.5, respectively, according to the table, (0.6+0.5)/1=1.1. Accordingly, for example, α and β are adjusted as follows.

α=0.6/1.1=0.55 β=0.5/1,1=0.45

Due to the configurations as described above, a combined distance can be calculated based on the distance obtained by performing block matching and the reliability of the distance that corresponds to a peak of a reflected signal.

i. Performing Fusion based on Cost

Three methods are described below for a fusion (principle fusion) between the data obtained by the LiDAR range finder 110 that emits a laser beam of low laser-beam resolution and the data obtained by the stereo camera unit 120.

Figure 24:
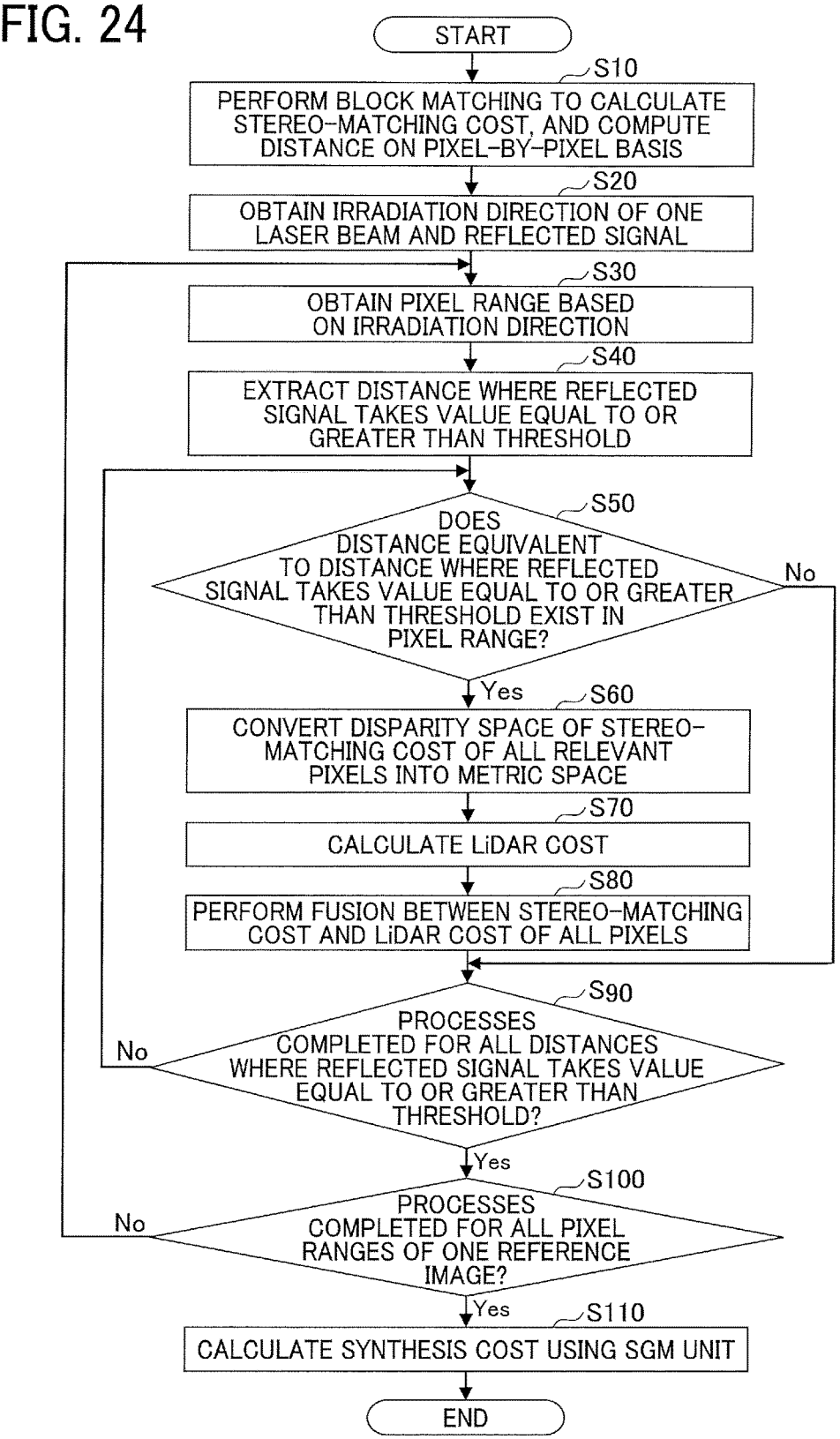
FIG. 24 is a flowchart of how a fusion is performed based on a cost, according to an embodiment of the present disclosure.

FIG. 24 is a flowchart of how a fusion is performed based on a cost, according to the present embodiment.

The processes in FIG. 24 are performed every time a pair of a reference image and a comparison image is captured.

Firstly, the stereo matching unit 23 performs block matching on a reference image and a comparison image to calculate the stereo-matching cost $C_{ST}$, and further computes the distance on a pixel-by-pixel basis (step S10).

The LiDAR range finder 110 emits a laser beam predetermined number of times while one reference image is being captured. Accordingly, the data acquisition unit 21 sequentially obtains the irradiation direction of one of the laser beams and a reflected signal from the LiDAR range finder 110 (step S20). The following processes are performed for each laser pulse (for each irradiation field).

Subsequently, the pixel-range determination unit 31 determines the pixel range by obtaining the pixel range that is association with the irradiation direction in the irradiation-direction pixel-range table 32 (step S30).

The distance calculator 28 determines the distance where the reflected signal takes a value equal to or greater than a threshold (step S40). When there are three peaks that correspond to the objects A to C as illustrated in FIG. 4, the distances La, Lb, and Lc are determined. These distances La, Lb, and Lc are used in common in one pixel range. The following processes are performed based on each one of the distances La, Lb, and Lc. For the sake of explanatory convenience, description is given under the assumption that the focus is on the distance La.

Subsequently, the determination unit 27 determines whether a distance equivalent to the distance La falls within a pixel range (step S50). Each of the pixels in the pixel range has the distance obtained by performing block matching. When one distance is equivalent to another distance, these two distances may be completely equal to each other, or these two distances may be slightly different from each other in a prescribed permissible range (for example, ±10%) with reference to the distance La.

When it is determined to be "NO" in the step S50, the process proceeds to a step S90, and the distance Lb subsequent to the distance La is processed in a similar manner.

When it is determined to be "YES" in the step S50, the distance interpolator 25 converts the disparity space of the stereo-matching cost $C_{ST}$ of all the relevant pixels with distances equivalent to the distance La into a metric space (step S60).

Subsequently, the reflected-signal cost converter 26 calculates the LiDAR cost $C_{LI}$ of the single laser beam determined in the step S30 (step S70).

Subsequently, the fusion unit 29 performs fusion between the stereo-matching cost $C_{ST}$ and the LiDAR cost Cu of all the pixels with distances equivalent to the distance La (step S80).

The fusion unit 29 determines whether all the distances La to Lc where the reflected signal takes a value equal to or greater than a threshold have been processed (step S90). When it is determined to be "NO" in the step S90, the process returns to the step S50, and the next distance Lb is processed.

When it is determined to be "YES" in the step S90, the fusion unit 29 determines whether all the reflected signals (i.e., all the pixel ranges) of the laser beam that is emitted to the single reference image have been processed (step S100). When it is determined to be "NO" in the step S100, the process returns to the step S30.

When it is determined to be "YES" in the step S100, it is assumed that a fusion on one reference image is completed and the SGM unit 24 calculates and obtains a synthesis cost (step S110).

Even when a laser beam of low laser-beam resolution is emitted, as described above, the fusion according to the present embodiment is performed and the planes of a plurality of objects existing in one pixel range, each of which indicates the distance, can be separated from each other by surface.

In the example embodiment as illustrated in FIG. 24, the SGM is performed after a fusion is performed. However, no limitation is indicated thereby, and the SGM may be performed before a fusion is performed. In such a configuration, for example, the SGM is performed subsequent to the step S10. Alternatively, the semi-global matching (SGM) may be omitted.

In the step S40 of FIG. 24, a reflected signal with a value equal to or greater than a threshold is detected. However, a reflected signal may be digitally processed (e.g., analog-to-digital (A/D) conversion), and the distance of each peak may be extracted. In the steps S50 to S90, these extracted distances are processed.

In the step S80, a fusion between a stereo-matching cost and a LiDAR cost is performed. a fusion between the stereo-matching cost and a reflected signal may be performed.

2. Replacement of Distance to Pixel obtained by performing Block Matching with Distance Data calculated based on Reflected Signal FIG. 25 is a flowchart of how a fusion is performed as the distance to each pixel obtained by performing block matching is replaced with the distance data that is calculated based on the reflected signal, according to the present embodiment.

Figure 25:
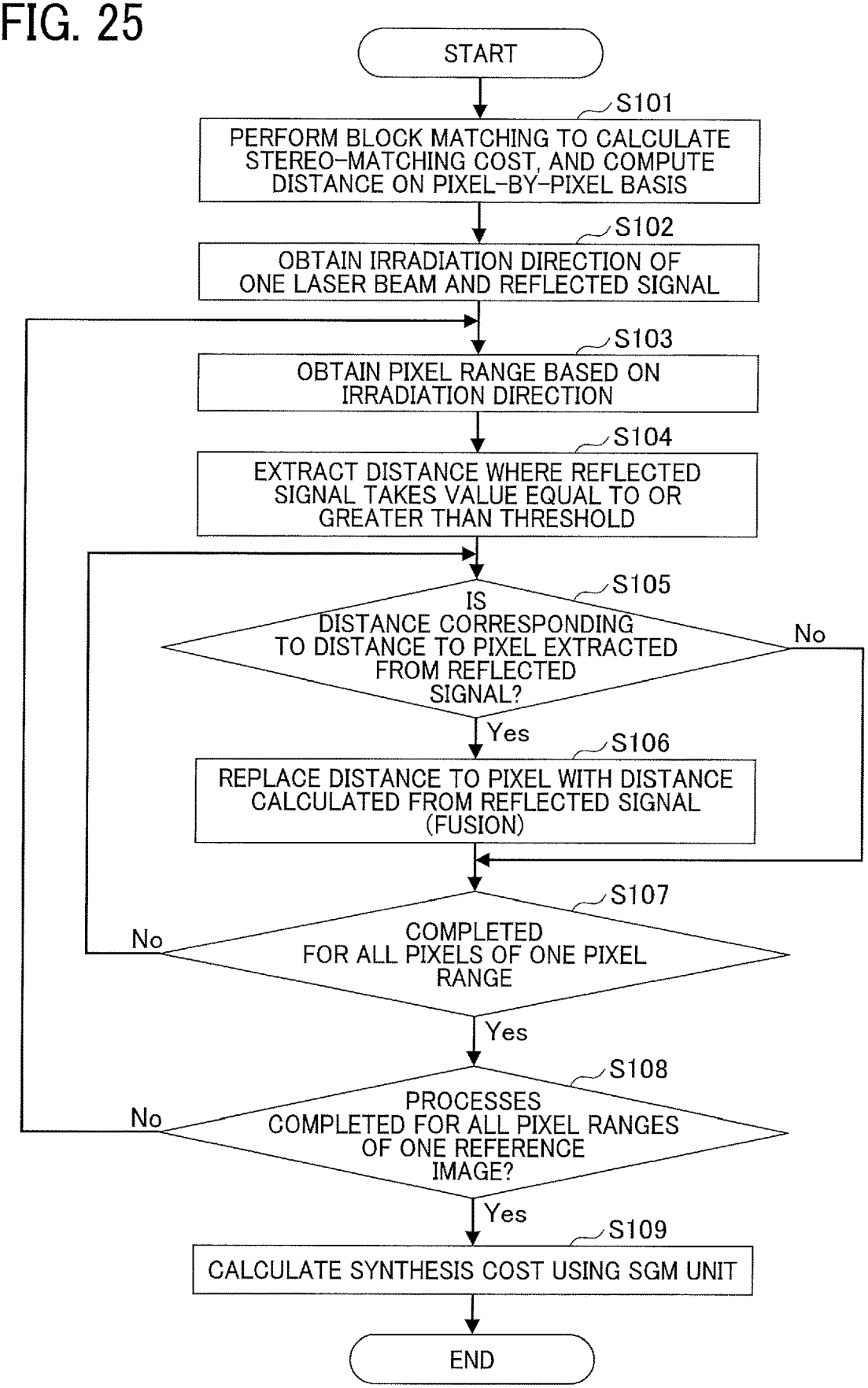
FIG. 25 is a flowchart of how a fusion is performed as the distance to each pixel obtained by performing block matching is replaced with the distance data that is calculated based on the reflected signal, according to an embodiment of the present disclosure.

In the description of FIG. 25, only the differences from the processes in FIG. 24 may be described.

The processes in the steps S101 to S104 in FIG. 25 are equivalent to the processes in the steps S10 to S40 in FIG. 24, respectively. The following processes are performed for each one of the pixels in a certain pixel range.

Subsequent to the step S104, the determination unit 27 focuses on one of the pixels in a certain pixel range, and determines whether the distance that corresponds to the distance to a pixel, which is obtained by performing block matching, is calculated from a reflected signal in the step S104 (step S105). In other words, whether the distances La to Lc calculated in the step S104 are equivalent to the distance to each pixel is determined.

When it is determined to be "NO" in the step S105, the process proceeds to a step S107 in order to judge the next pixel. In other words, the fusion unit 29 does not replace the distance to each pixel obtained by performing block matching with the distance data that is calculated based on a reflected signal.

When it is determined to be "YES" in the step S105, the fusion unit 29 replaces the distance to a pixel of interest with the distance data that is calculated based on a reflected signal (step S106). When the three distances La to Lc are calculated from a reflected signal, the distance to a pixel is replaced with one of the distances La to Lc.

Subsequently, the fusion unit 29 determines whether the processes are completed for all the pixels in one pixel range (step S107). When it is determined to be "NO" in the step S107, the process returns to the step S105 in order to perform a fusion on the next pixel. As described above, a fusion is performed on each one of the pixels existing in a pixel range.

When it is determined to be "YES" in the step S107, the fusion unit 29 determines whether the processes are completed for all the pixel ranges of one reference image (step S108). When it is determined to be "NO" in the step S108, the process returns to the step S103.

When it is determined to be "YES" in the step S109, the SGM unit 24 calculates and obtains a synthesis cost (step S110).

Even when a laser beam of low laser-beam resolution is emitted, as described above, the fusion according to the present embodiment is performed and the planes of a plurality of objects existing in one pixel range, each of which indicates the distance, can be separated from each other by surface.

3. Replacement of Distance to Pixel obtained by performing Block Matching with Distance Data calculated based on Reflected Signal As a modification of the processes in FIG. 25, the procedure in which a fusion is performed after the SGM is performed is described below.

Figure 26:
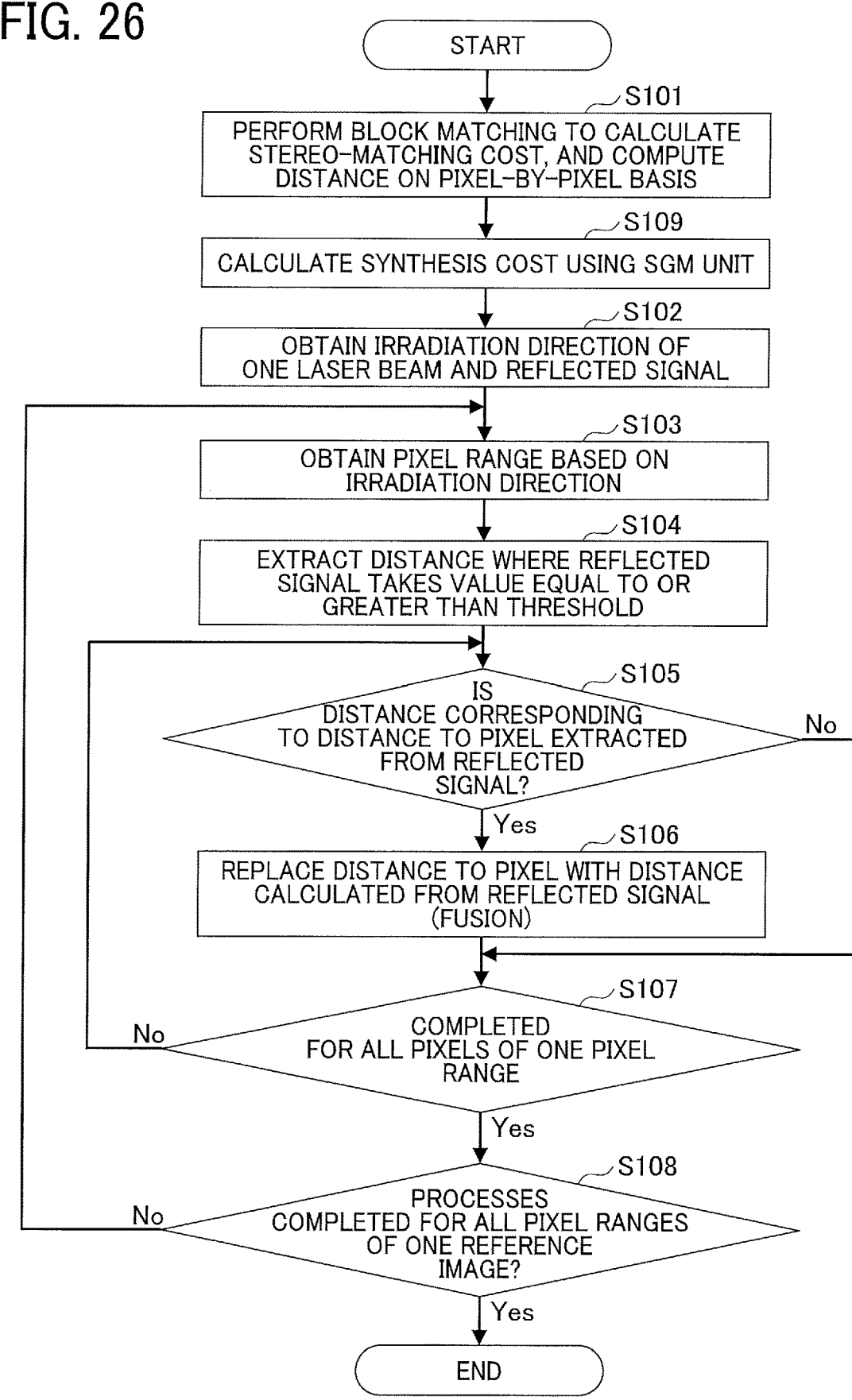
FIG. 26 is a flowchart of how a fusion is performed as the distance to each pixel obtained by performing block matching is replaced with the distance data that is calculated based on the reflected signal, according to an embodiment of the present disclosure.

FIG. 26 is a flowchart of how a fusion is performed as the distance to each pixel obtained by performing block matching is replaced with the distance data that is calculated based on the reflected signal, according to the present embodiment.

In the description of FIG. 26, only the differences from the processes in FIG. 25 may be described.

Subsequent to the step S101, as illustrated in FIG. 26, a synthesis cost is calculated in a step S109 using the SGM. As described above, a fusion can be performed in a similar manner even when a synthesis cost is calculated before a fusion is performed.

Some advantageous effects of the distance-measuring apparatus 100 according to the present embodiment are described below with reference to FIG. 27A and FIG. 27B.

Figure 27A:
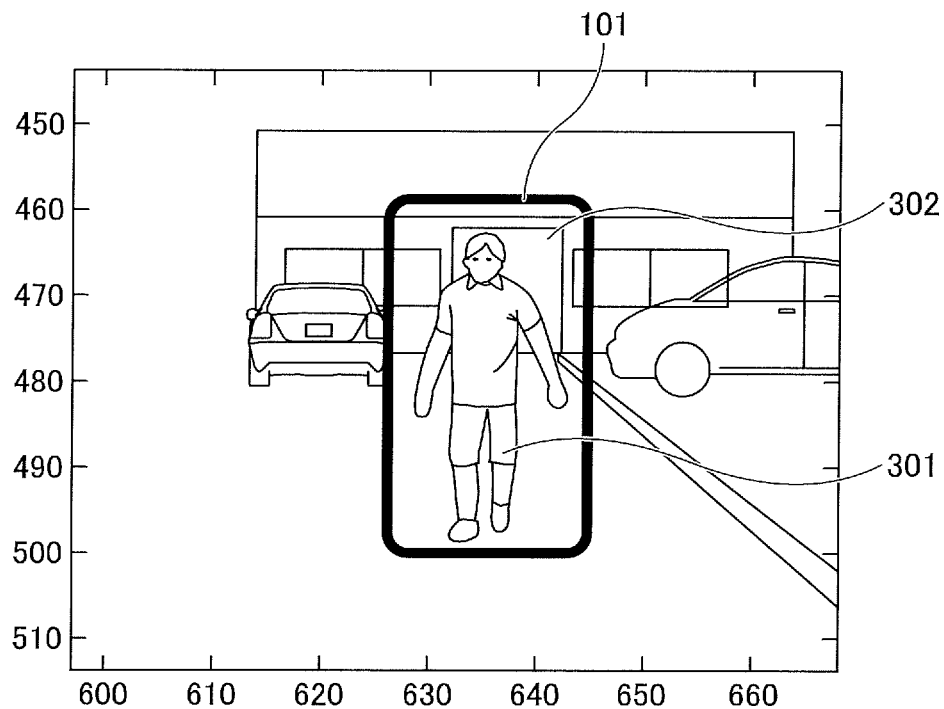
FIG. 27A and FIG. 27B are diagrams illustrating a scene in which the distance is measured by a distance-measuring apparatus and a distance image are illustrated, respectively, according to an embodiment of the present disclosure.
Figure 27B:
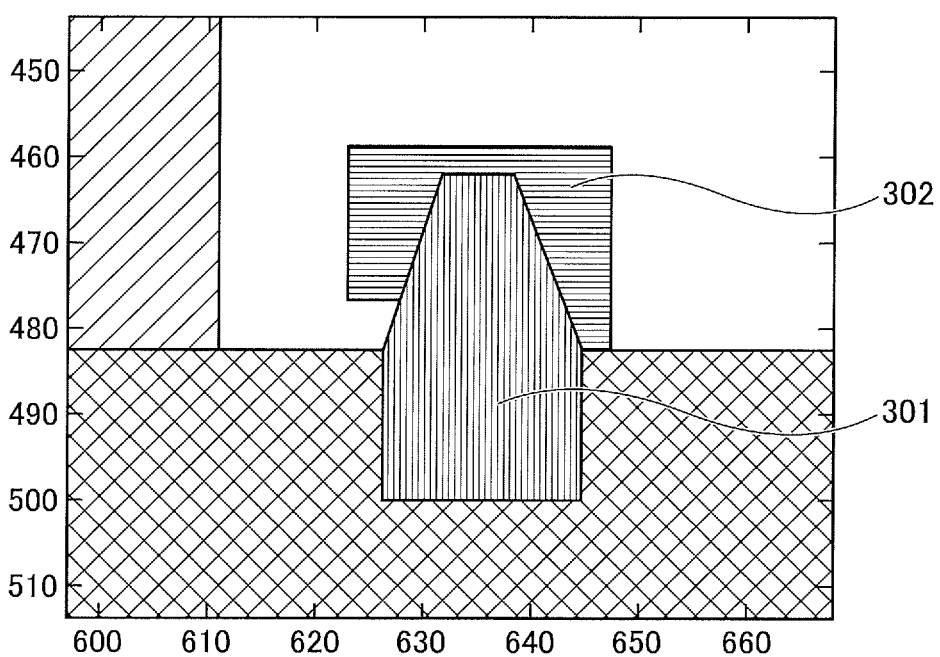

FIG. 27A and FIG. 27B are diagrams illustrating a scene in which the distance is measured by the distance-measuring apparatus 100 and a distance image are illustrated, respectively, according to the present embodiment.

As illustrated in FIG. 27A, the distance-measuring apparatus 100 irradiates an irradiation field 101 including a person 301 and a high-reflection reflector 302 with a single laser beam. The distance to the person 301 is about 57 meters (m), and the distance to the high-reflection reflector 302 is about 147 m. In this situation, so-called multiple pulses in which a peak of the person 301 and a peak of the high-reflection reflector 302 are detected are obtained from a reflected signal.

FIG. 27B is a diagram illustrating the distance image of the image data illustrated in FIG. 27A.

The distance image as illustrated in FIG. 27B is obtained by performing a principle fusion in which the distance to each pixel obtained by performing block matching is replaced with the distance data that is calculated based on the reflected signal. In an actual configuration, the distance on a distance image is indicated by color. For the sake of explanatory convenience in drawing, the distances are indicated by hatching or the like in FIG. 27B. The same kind of hatching indicates the same distance.

As illustrated in FIG. 27B, the person 301 and the high-reflection reflector 302 are separated by different planes each of which indicates the distance. In other words, even in an occlusion area where a person and a high-reflection reflector overlaps with each other, the distance-measuring apparatus 100 according to the present embodiment can successfully separate the planes of objects by surface, each of which indicates the distance, with a correct distance value and a high degree of accuracy.

As described above, the distance-measuring apparatus 100 according to the present embodiment emits a laser beam of low laser-beam resolution. Due to such a configuration, space saving or cost reduction of the distance-measuring apparatus 100 can be achieved. Moreover, a principle fusion is performed between the data obtained by a stereo camera and the data obtained by a LiDAR device at an early stage. Accordingly, even when multiple pulses occur at a plurality of objects, the distance image can be separated from each other by surface.

Numerous additional modifications and variations are possible in light of the above teachings. It is therefore to be understood that within the scope of the appended claims, the disclosure of the present invention may be practiced otherwise than as specifically described herein. For example, elements and/or features of different illustrative embodiments may be combined with each other and/or substituted for each other within the scope of this disclosure and appended claims.

In the embodiment described above, cases in which the stereo-matching cost $C_{ST}$ of each pixel is calculated are described. However, no limitation is indicated thereby, and a stereo-matching cost $C_{ST}$ may be calculated for every pixel area. Even when a stereo-matching cost $C_{ST}$ is calculated for every pixel area, the distance to each pixel is set.

In the embodiment as described above, cases in which the stereo camera unit 120 and the LiDAR range finder 110 are formed as a single integrated unit are described. However, the LiDAR range finder 110 and the stereo camera unit 120 may be configured separately.

In the embodiment as described above, the laser signal processor 240 mainly extracts a peak from an analog signal, and the stereo image computation unit 250 handles a digital signal. However, no limitation is indicated thereby, and immediately after the light-receiving element 235 receives a reflected signal, the laser signal processor 240 may convert the obtained reflected signal into a digital signal and may extract a peak from the obtained digital signal.

In the embodiment as described above, each of the stereo image computation unit 250 and the laser signal processor 240 is configured by a dedicated integrated circuit. However, for example, a recording medium storing the program codes of software that implements the functions of the stereo image computation unit 250 and the laser signal processor 240 may be provided for an information processing apparatus to implement the functions of the stereo image computation unit 250 and the laser signal processor 240.

In the embodiment as described above, cases in which the distance-measuring apparatus 100 is installed in the vehicle 140 are described. However, the distance-measuring apparatus 100 may be installed, for example, in a motorbike, a bicycle, a wheelchair, and an agricultural cultivator. Alternatively, the distance-measuring apparatus 100 may be installed in a mobile object such as an autonomous mobile robot, a flight vehicle such as a drone, or an industrial robot that is disposed in a fixed manner in factory automation (FA).

At least some of the block matching operation may be performed by the ECU 190, and some of the operation of the ECU 190 may be performed by the stereo image computation unit 250.

Note also that the stereo matching unit 23 is an example of a converter, and the laser beam source 232 and the projector lens 233 are an example of an irradiation unit. The light-receptive lens 234 and the light-receiving element 235 are an example of a light receiver, and the distance calculator 28 is an example of a distance calculator. The fusion unit 29 is an example of an integration unit, and the distance that is converted by the stereo matching unit 23 by performing block matching is an example of first distance information. The distance information that is calculated by the distance calculator 28 is an example of second distance information.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

What is claimed is:
1. A distance-measuring apparatus comprising
a plurality of imaging devices configured to obtain a plurality of images;
an irradiation device configured to emit a laser beam, wherein
at least one of a laser-beam resolution in a horizontal direction or a laser-beam resolution in a vertical direction exceeds two degrees;
a light receiver configured to obtain a reflected signal of the laser beam as reflected by an object; and
circuitry configured to:
perform matching for the plurality of images obtained by the plurality of imaging devices to convert the plurality of images into first distance information on a pixel-by-pixel basis,
detect a peak that corresponds to reflection from the object from the reflected signal and calculate second distance information based on a length of time taken to observe the peak after the laser beam is emitted by the irradiation device, and
integrate the first distance information with the second distance information
convert a reflected signal received by the light receiver into a LiDAR cost whose value decreases as a value of the reflected signal increases, and
combine a stereo-matching cost of each pixel of the plurality of images, the stereo-matching cost being obtained by block matching with the LiDAR cost.
2. The distance-measuring apparatus according to claim 1, wherein the circuitry is further configured to:
determine a pixel range corresponding to an irradiation field of one laser beam, and
combine the first distance information in the pixel range with the second distance information in the pixel range.
3. The distance-measuring apparatus according to claim 2, wherein the circuitry is further configured to:

combine a stereo-matching cost of each pixel obtained by performing block matching on a pixel in the pixel range that has the first distance information equivalent to the second distance information obtained from the peak of the reflected signal with the LiDAR cost in the pixel range.

4. The distance-measuring apparatus according to claim 2, wherein, when the first distance information is calculated from the peak and the reflected signal has the peak equivalent to the second distance information obtained by performing block, matching on a pixel in the pixel range, the circuitry replaces the second distance information included in a pixel in the pixel range with the first distance information obtained from the reflected signal of a laser beam whose irradiation field is equivalent to the pixel range.

5. The distance-measuring apparatus according to claim 1, wherein the laser beam emitted by the irradiation device has a horizontally-oriented irradiation field having a horizontal length that is longer than a vertical length.

6. The distance-measuring apparatus according to claim 1, wherein the laser beam emitted by the irradiation device has a vertically-oriented irradiation field having a vertical length that is longer than a horizontal length.

7. A mobile object comprising the distance-measuring apparatus according to claim 1.

8. A method of measuring distance, the method comprising:
performing matching for a plurality of images obtained by a plurality of imaging devices to convert the plurality of images into first distance information on a pixel-by-pixel basis;
emitting a laser beam where at least one of a laser-beam resolution in a horizontal direction or a laser-beam resolution in a vertical direction exceeds two degrees;
obtaining a reflected signal of the laser beam as reflected by an object;
detecting a peak that corresponds to reflection from the object from the reflected signal;
calculating second distance information based on a length of time taken to observe the peak after the laser beam is emitted in the emitting; and
integrating the first distance information with the second distance information
converting a reflected signal received by the light receiver into a LiDAR cost whose value decreases as a value of the reflected signal increases, and
combining a stereo-matching cost of each pixel of the plurality of images, the stereo-matching cost being obtained by block matching with the LiDAR cost.

9. A distance-measuring system comprising:
a plurality of imaging devices configured to obtain a plurality of images;
an irradiation device configured to emit a laser beam, wherein
at least one of a laser-beam resolution in a horizontal direction or a laser-beam resolution in a vertical direction exceeds two degrees;
a light receiver configured to obtain a reflected signal of the laser beam as reflected by an object, and
circuitry configured to
perform matching for the plurality of images obtained by the plurality of imaging devices to convert the plurality of images into first distance information on a pixel-by-pixel basis,
detect a peak that corresponds to reflection from the object from the reflected signal and calculate second distance information based on a length of time taken to observe the peak after the laser beam is emitted by the irradiation device, and
integrate the first distance information with the second distance information
convert a reflected signal received by the light receiver into a LiDAR cost whose value decreases as a value of the reflected signal increases, and
combine a stereo-matching cost of each pixel of the plurality of images, the stereo-matching cost being obtained by block matching with the LiDAR cost.

* * * * *